US012082231B2

(12) United States Patent
Zhang et al.

(10) Patent No.: US 12,082,231 B2
(45) Date of Patent: Sep. 3, 2024

(54) SIDELINK ASSISTED CROSS LINK INTERFERENCE DETERMINATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(*) Notice: Subject to any disclaimer, the term of this patent is extended or adjusted under 35 U.S.C. 154(b) by 326 days.

(21) Appl. No.: 17/517,082

(22) Filed: Nov. 2, 2021

(65) Prior Publication Data

US 2023/0139197 A1  May 4, 2023

(51) Int. Cl.
*H04W 72/542* (2023.01)
*H04W 28/26* (2009.01)
*H04W 72/044* (2023.01)
*H04W 72/1263* (2023.01)
*H04W 72/20* (2023.01)

(52) U.S. Cl.
CPC ......... *H04W 72/542* (2023.01); *H04W 28/26* (2013.01); *H04W 72/044* (2013.01); *H04W 72/1263* (2013.01); *H04W 72/20* (2023.01)

(58) Field of Classification Search
CPC ... H04W 72/542; H04W 72/20; H04W 28/26; H04W 72/044; H04W 72/1263
See application file for complete search history.

(56) References Cited

U.S. PATENT DOCUMENTS

| 2014/0169234 | A1* | 6/2014 | Zhu | H04W 72/541 370/277 |
| 2019/0207662 | A1* | 7/2019 | Zhou | H04W 72/0446 |
| 2019/0380132 | A1* | 12/2019 | Hu | H04W 4/70 |
| 2020/0205161 | A1* | 6/2020 | Zhou | H04W 74/002 |
| 2021/0315057 | A1* | 10/2021 | Baek | H04W 76/10 |
| 2021/0368489 | A1* | 11/2021 | Sarkis | H04W 24/08 |

FOREIGN PATENT DOCUMENTS

| EP | 2793523 A1 | 10/2014 |
| WO | WO-2020214007 A1 | 10/2020 |

OTHER PUBLICATIONS

International Search Report and Written Opinion—PCT/US2022/078295—ISA/EPO—Jan. 4, 2023.

* cited by examiner

*Primary Examiner* — Ajay Cattungal

(57) ABSTRACT

Methods, systems, and devices for sidelink assisted cross-link interference (CLI) determination are described. In some examples, a first wireless device may perform a first measurement of a sidelink message received from a second wireless device. As such, the first wireless device may transmit, to a base station, a report indicating that the second wireless device is estimated to be within a defined proximity of the first wireless device based at least in part on the first measurement satisfying a threshold. In some examples, the first wireless device may receive a control message, from the base station, scheduling transmission of a message between the base station and the first wireless device in a frequency resource in response to the report that the second wireless device is estimated to be within the defined proximity of the first wireless device.

28 Claims, 18 Drawing Sheets

SIDELINK ASSISTED CROSS LINK INTERFERENCE DETERMINATION

FIELD OF TECHNOLOGY

The following relates to wireless communications, including sidelink assisted cross-link interference (CLI) determination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, devices communicating in a full duplex environment may experience cross-link interference (CLI). For example, full duplex communications between a base station and a first user equipment (UE) may cause interference with communications of a second UE. In some examples, a base station may allocate resources for measuring CLI among UEs, which involves signaling overhead for measuring CLI and reporting CLI, and consumes UE battery power.

SUMMARY

The described techniques relate to improved methods, systems, devices, and apparatuses that support sidelink assisted cross-link interference (CLI) determination. Generally, the described techniques provide for performing measurements on sidelink messages to identify proximal wireless devices and report such devices to a base station. In some examples, a first wireless device may perform a first measurement of a sidelink message received from a second wireless device. When the first measurement satisfies a threshold, the first wireless device may transmit, to a base station, a report indicating that the second wireless device is estimated to be within a defined proximity of the first wireless device (e.g., within a certain distance of one another). In some examples, the base station may receive the report and may determine a communication scheme for the wireless devices. In some examples, the base station may avoid scheduling full duplex communications with a second UE and a first UE, for example, as a CLI between communications with the first UE and communications with the second UE may result in diminished communication quality. In other examples, the base station may schedule frequency division multiplexing (FDM) based full duplex communications with the UEs. For example, the base station may configure the first UE with a first communication in a first frequency resource and configure the second UE with a second communication in a second frequency resource, where the first frequency resource and the second frequency resource may occur during a same time period, transmission time interval (TTI), or any other time interval.

A method for wireless communication at a first wireless device is described. The method may include performing a first measurement of a sidelink message received from a second wireless device, transmitting, to a base station, a report indicating that the second wireless device is estimated to be within a defined proximity of the first wireless device based on the first measurement satisfying a threshold, and receiving a control message, from the base station, scheduling transmission of a message between the base station and the first wireless device in a frequency resource in response to the report indicating that the second wireless device is estimated to be within the defined proximity of the first wireless device.

An apparatus for wireless communication at a first wireless device is described. The apparatus may include a processor, memory coupled with the processor, and instructions stored in the memory. The instructions may be executable by the processor to cause the apparatus to perform a first measurement of a sidelink message received from a second wireless device, transmit, to a base station, a report indicating that the second wireless device is estimated to be within a defined proximity of the first wireless device based on the first measurement satisfying a threshold, and receive a control message, from the base station, scheduling transmission of a message between the base station and the first wireless device in a frequency resource in response to the report indicating that the second wireless device is estimated to be within the defined proximity of the first wireless device.

Another apparatus for wireless communication at a first wireless device is described. The apparatus may include means for performing a first measurement of a sidelink message received from a second wireless device, means for transmitting, to a base station, a report indicating that the second wireless device is estimated to be within a defined proximity of the first wireless device based on the first measurement satisfying a threshold, and means for receiving a control message, from the base station, scheduling transmission of a message between the base station and the first wireless device in a frequency resource in response to the report indicating that the second wireless device is estimated to be within the defined proximity of the first wireless device.

A non-transitory computer-readable medium storing code for wireless communication at a first wireless device is described. The code may include instructions executable by a processor to perform a first measurement of a sidelink message received from a second wireless device, transmit, to a base station, a report indicating that the second wireless device is estimated to be within a defined proximity of the first wireless device based on the first measurement satisfying a threshold, and receive a control message, from the base station, scheduling transmission of a message between the base station and the first wireless device in a frequency resource in response to the report indicating that the second wireless device is estimated to be within the defined proximity of the first wireless device.

Some examples of the method, apparatuses, and non-transitory computer-readable medium described herein may further include operations, features, means, or instructions for transmitting the report indicating the first measurement.

Some examples of the method, apparatuses, and non-transitory computer-readable medium described herein may further include operations, features, means, or instructions for monitoring a sidelink channel for resource reservations, where the sidelink message may be a resource reservation received from the second wireless device via the sidelink channel based on the monitoring.

Some examples of the method, apparatuses, and non-transitory computer-readable medium described herein may further include operations, features, means, or instructions for transmitting the report indicating a source identifier of the second wireless device.

Some examples of the method, apparatuses, and non-transitory computer-readable medium described herein may further include operations, features, means, or instructions for receiving, from the base station, control information indicating the threshold.

In some examples of the method, apparatuses, and non-transitory computer-readable medium described herein, the threshold includes a reference signal received power (RSRP) threshold.

Some examples of the method, apparatuses, and non-transitory computer-readable medium described herein may further include operations, features, means, or instructions for transmitting the report indicating a measured beam identifier, a panel identifier, or both.

Some examples of the method, apparatuses, and non-transitory computer-readable medium described herein may further include operations, features, means, or instructions for transmitting the report periodically, semi-persistently, or aperiodically.

Some examples of the method, apparatuses, and non-transitory computer-readable medium described herein may further include operations, features, means, or instructions for receiving control signaling indicating a trigger for transmitting the report when a neighbor user equipment (UE) may be estimated to be within the defined proximity of the first wireless device.

Some examples of the method, apparatuses, and non-transitory computer-readable medium described herein may further include operations, features, means, or instructions for receiving control signaling indicating a deactivation trigger indicating that the first wireless device may be to refrain from transmitting a second report.

Some examples of the method, apparatuses, and non-transitory computer-readable medium described herein may further include operations, features, means, or instructions for receiving control signaling indicating a trigger for transmitting the report in accordance with a measurement satisfying the threshold.

In some examples of the method, apparatuses, and non-transitory computer-readable medium described herein, the first measurement may be a RSRP measurement, an interference measurement, a CLI measurement, a received signal strength indicator, a signal to noise ratio (SNR) measurement, a signal to interference plus noise ratio (SINR) measurement, or any combination thereof.

In some examples of the method, apparatuses, and non-transitory computer-readable medium described herein, the sidelink message may be a UE dedicated sidelink control information message or a group based sidelink control information message.

A method for wireless communications at a base station is described. The method may include receiving, from a first wireless device, a report indicating that a second wireless device is estimated to be within a defined proximity of the first wireless device, transmitting a first control message to the first wireless device scheduling transmission of a first message between the base station and the first wireless device in a first frequency resource, and transmitting a second control message to the second wireless device scheduling transmission of a second message between the base station and the second wireless device in a second frequency resource, where the first frequency resource and the second frequency resource are distinct frequency resources and occur in a same TTI.

An apparatus for wireless communications at a base station is described. The apparatus may include a processor, memory coupled with the processor, and instructions stored in the memory. The instructions may be executable by the processor to cause the apparatus to receive, from a first wireless device, a report indicating that a second wireless device is estimated to be within a defined proximity of the first wireless device, transmit a first control message to the first wireless device scheduling transmission of a first message between the base station and the first wireless device in a first frequency resource, and transmit a second control message to the second wireless device scheduling transmission of a second message between the base station and the second wireless device in a second frequency resource, where the first frequency resource and the second frequency resource are distinct frequency resources and occur in a same TTI.

Another apparatus for wireless communications at a base station is described. The apparatus may include means for receiving, from a first wireless device, a report indicating that a second wireless device is estimated to be within a defined proximity of the first wireless device, means for transmitting a first control message to the first wireless device scheduling transmission of a first message between the base station and the first wireless device in a first frequency resource, and means for transmitting a second control message to the second wireless device scheduling transmission of a second message between the base station and the second wireless device in a second frequency resource, where the first frequency resource and the second frequency resource are distinct frequency resources and occur in a same TTI.

A non-transitory computer-readable medium storing code for wireless communications at a base station is described. The code may include instructions executable by a processor to receive, from a first wireless device, a report indicating that a second wireless device is estimated to be within a defined proximity of the first wireless device, transmit a first control message to the first wireless device scheduling transmission of a first message between the base station and the first wireless device in a first frequency resource, and transmit a second control message to the second wireless device scheduling transmission of a second message between the base station and the second wireless device in a second frequency resource, where the first frequency resource and the second frequency resource are distinct frequency resources and occur in a same TTI.

Some examples of the method, apparatuses, and non-transitory computer-readable medium described herein may further include operations, features, means, or instructions for transmitting, to the first wireless device, control information indicating a threshold associated with estimating wireless devices to be within the defined proximity of the first wireless device.

In some examples of the method, apparatuses, and non-transitory computer-readable medium described herein, the threshold includes a RSRP threshold.

Some examples of the method, apparatuses, and non-transitory computer-readable medium described herein may further include operations, features, means, or instructions for receiving the report including one or more identifiers corresponding to the first wireless device, the second wireless device, or a combination thereof.

In some examples of the method, apparatuses, and non-transitory computer-readable medium described herein, the one or more identifiers include a measured beam identifier, a panel identifier, or a both.

Some examples of the method, apparatuses, and non-transitory computer-readable medium described herein may further include operations, features, means, or instructions for identifying interference associated with the one or more identifiers, where scheduling the transmission of the first message and scheduling the transmission of the second message may be based on identifying the interference.

Some examples of the method, apparatuses, and non-transitory computer-readable medium described herein may further include operations, features, means, or instructions for transmitting control signaling indicating a trigger to transmit the report in accordance with estimating the second wireless device to be within the defined proximity of the first wireless device.

Some examples of the method, apparatuses, and non-transitory computer-readable medium described herein may further include operations, features, means, or instructions for transmitting control signaling indicating a deactivation trigger configuring the first wireless device to refrain from transmitting the report.

Some examples of the method, apparatuses, and non-transitory computer-readable medium described herein may further include operations, features, means, or instructions for transmitting control signaling indicating a trigger for transmitting the report in accordance with a measurement satisfying a threshold.

Some examples of the method, apparatuses, and non-transitory computer-readable medium described herein may further include operations, features, means, or instructions for receiving the report indicating a first measurement, where transmitting the first control message and transmitting the second control message may be based on the first measurement.

In some examples of the method, apparatuses, and non-transitory computer-readable medium described herein, the first measurement may be a RSRP measurement, an interference measurement, a CLI measurement, a received signal strength indicator, a SNR measurement, a SINR ratio measurement, or any combination thereof.

In some examples of the method, apparatuses, and non-transitory computer-readable medium described herein, the first frequency resource and the second frequency resource may be separated by one or more guard tones, one or more resource elements, a frequency range, or any combination thereof.

In some examples of the method, apparatuses, and non-transitory computer-readable medium described herein, the first frequency resource and the second frequency resource occur within a same bandwidth part.

Some examples of the method, apparatuses, and non-transitory computer-readable medium described herein may further include operations, features, means, or instructions for receiving, from a third wireless device, a second report indicating that a fourth wireless device may be estimated to be within a defined proximity of the third wireless device and refraining from scheduling full duplex communication with the third wireless device, the fourth wireless device, or both.

A method for wireless communications at a base station is described. The method may include receiving, from a first wireless device, a report indicating that a second wireless device is estimated to be within a defined proximity of the first wireless device and refraining from scheduling full duplex communication with the first wireless device, the second wireless device, or both, based on the report.

An apparatus for wireless communications at a base station is described. The apparatus may include a processor, memory coupled with the processor, and instructions stored in the memory. The instructions may be executable by the processor to cause the apparatus to receive, from a first wireless device, a report indicating that a second wireless device is estimated to be within a defined proximity of the first wireless device and refrain from scheduling full duplex communication with the first wireless device, the second wireless device, or both, based on the report.

Another apparatus for wireless communications at a base station is described. The apparatus may include means for receiving, from a first wireless device, a report indicating that a second wireless device is estimated to be within a defined proximity of the first wireless device and means for refraining from scheduling full duplex communication with the first wireless device, the second wireless device, or both, based on the report.

A non-transitory computer-readable medium storing code for wireless communications at a base station is described. The code may include instructions executable by a processor to receive, from a first wireless device, a report indicating that a second wireless device is estimated to be within a defined proximity of the first wireless device and refrain from scheduling full duplex communication with the first wireless device, the second wireless device, or both, based on the report.

Some examples of the method, apparatuses, and non-transitory computer-readable medium described herein may further include operations, features, means, or instructions for transmitting, to the first wireless device, control information indicating a threshold associated with estimating wireless devices to be within the defined proximity of the first wireless device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
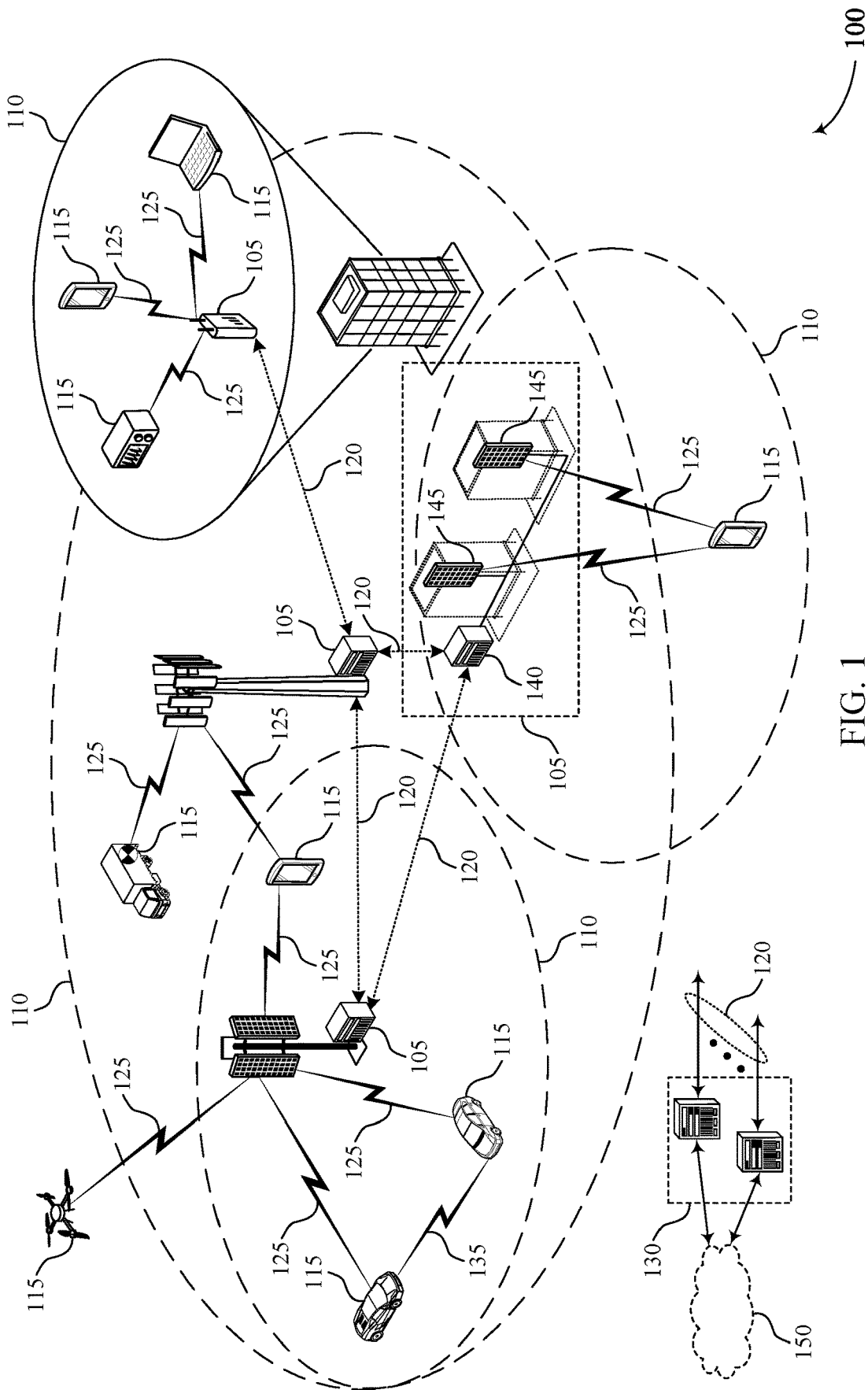
FIGS. 1 and 2 illustrate examples of wireless communication systems that support sidelink assisted cross-link interference (CLI) determination in accordance with aspects of the present disclosure.

In some cases, devices communicating in a full duplex environment may experience cross-link interference (CLI). For example, full duplex communications of a first user equipment (UE) may interfere with communications of a second UE. In some examples, a CLI framework may use UL resources to measure CLI among UEs, which may increase overhead for measuring CLI and reporting CLI and may also affect UE power and interference. For example, a base station may configure both the first UE and the second UE with sounding reference signal (SRS) resources associated with a CLI measurement procedure. In such examples, the base station may configure the first UE to transmit an SRS during a set of time-frequency resources and may configure the second UE to perform a channel measurement (e.g., reference signal received power (RSRP)) on the set of time-frequency resources to determine CLI between communications of the base station and the first UE. In some cases, it may be beneficial to minimize the usage of CLI measurements, reports, or the like. That is, mitigating overhead associated with CLI determination may result in increased communication efficiency, power savings, among other communication gains.

In some examples, a UE may report, to a base station, one or more detected neighbor UEs in close proximity, without additional CLI measurement (e.g., associated with measuring SRS). For example, the first UE may be configured to detect proximal UEs and may transmit a report to the base station indicating that the proximal UEs are estimated to be within a defined proximity of the first UE. In some examples, the first UE may detect sidelink messages (e.g., for resource reservation) associated with the proximal UEs. For example, the second UE may transmit one or more sidelink control information (SCI) messages to reserve a sidelink channel and the first UE may perform measurements on the one or more SCI messages, where the first UE may determine the second UE to be within the defined proximity if at least one of the measurements satisfies a threshold.

The base station may receive the sidelink assisted report and may determine a communication scheme for the UEs. In some examples, the base station may avoid scheduling full duplex communications with the second UE and the first UE, because full-duplex communications would likely result in unacceptable levels of CLI between the first and second UEs. For example, the report may indicate that the second UE is in the defined proximity to the first UE and the base station may refrain from scheduling the first UE and the second UE for full duplex communications based on receiving the report. In some examples, the base station may schedule frequency division multiplexing (FDM) based full duplex communications with one or more guard tones for scheduling full duplex communications with the UEs. That is, the base station may schedule a first communication with the first UE in a first frequency resource and schedule a second communication with the second UE in a second frequency resource, where the first frequency resource and the second frequency resource may be separated in frequency by a guard band or one or more guard tones and may occur during a same time period (e.g., a same symbol period, same mini-slot, same slot, subframe, etc.).

Configuring the first UE to detect proximal UEs based on performing measurements on transmitted SCIs may mitigate overhead otherwise associated with CLI determination, for example, in cases where the second UE may transmit SRS during a set of time-frequency resources and the first UE may measure the SRS for CLI determination. In this way, overhead may be reduced for measuring and reporting CLI.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to sidelink assisted CLI determination.

FIG. 1 illustrates an example of a wireless communications system 100 that supports sidelink assisted CLI determination in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels.

In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may report, to a base station 105, one or more detected neighbor UEs in close proximity, without additional CLI measurement (e.g., associated with measuring SRS). The base station 105 may receive the report and may determine a communication scheme for the UEs 115, based on the base station 105 being configured to refrain from scheduling the reporting UE 115 and any reported neighbor UE 115 for full duplex communications. In some examples, the base station 105 may configure to use FDM based full duplex communications with one or more guard tones for scheduling full duplex communications with the UEs 115 determined to be within a defined proximity of one another.

Figure 2:
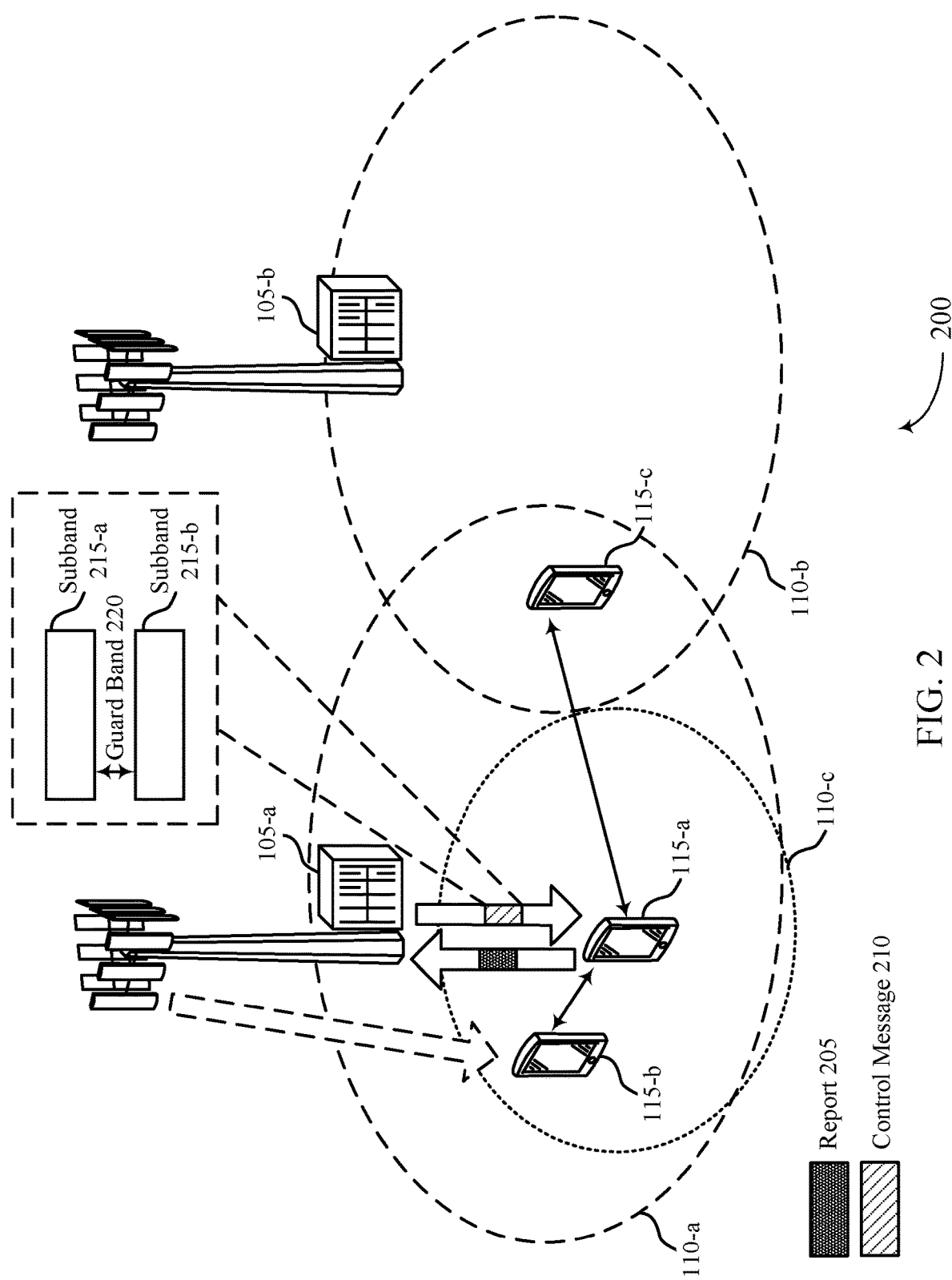

FIG. 2 illustrates an example of a wireless communications system 200 that supports sidelink assisted CLI determination in accordance with aspects of the present disclosure. The wireless communications system 200 may implement or be implemented by aspects of the wireless communications system 100. For example, the wireless communications system 200 may include base station 105-a and base station 105-b as well as UE 115-a, UE 115-b, and UE 115-c, which may be examples of corresponding devices described with reference to FIG. 1. In some examples, the base station 105-a may communicate with one or more UEs 115 in coverage area 110-a, for example, scheduling the UE 115-a and the UE 115-b for communications during a same time period. In some examples, the UE 115-a may determine that UE 115-b is within a defined proximity (e.g., within coverage area 110-c) to the UE 115-a and may inform the base station 105-a accordingly. As such, the base station may schedule the UEs 115 with (or without) full duplex communications.

In some cases, devices may communicate with one another using full duplex communications. For example, communications in a full duplex mode may enable the UE 115-a and the UE 115-b to transmit and receive data in a same time period (e.g., in a same slot or symbol). In some cases, wireless communications systems may be configured to experience one or more benefits of full duplex communications, for example, in cases where devices transmit and receive simultaneous uplink and downlink transmissions in frequency range 2 (FR2) and the like. In some cases, full duplex capability may be present at a base station 105, a UE 115, or both. For example, at UE 115-a, uplink information may be transmitted from a first antenna panel and downlink information may be received at a second antenna panel. In another example, at base station 105-a, uplink information may be received at a first antenna panel and downlink information may be transmitted from a second antenna panel. In some cases, full duplex capability may be conditional on beam separation (e.g., a physical separation between two or more communication beams), a presence of self-interference (e.g., interfering uplink and downlink at a device), clutter echo, among other factors that may impede full duplex communications. For example, devices communicating with proximal communication beams may refrain from using full duplex communications with the proximal communication beams. In some examples, configuring devices to communicate using full duplex communications may result in latency reduction (e.g., as it may be possible to receive downlink signals in uplink-only slots), enhanced spectral efficiency (e.g., per cell, per UE 115), more efficient resource utilization, enhanced coverage, among other communication gains.

Wireless communications systems may support a variety of full duplex implementations. For example, in a multi-TRP (mTRP) implementation, a single UE 115 may be connected to a first TRP via downlink and may be connected to a second TRP via uplink. In the example of wireless communications system 200, UE 115-a may receive downlink from base station 105-a during a same time period that the UE 115-a may transmit uplink to the base station 105-b. In another example, multiple UEs 115 may be connected via uplink and downlink to a single TRP. In the example of wireless communications system 200, the base station 105-a may be configured to simultaneously transmit downlink to the UE 115-b and receive uplink from the UE 115-a. In yet another example, a single UE 115 may be connected with both uplink and downlink to a single TRP. In the example of wireless communications system 200, the UE 115-a may be configured to simultaneously transmit uplink and receive downlink from the base station 105-a.

In some cases, devices communicating in a full duplex environment may experience CLI. For example, full duplex communications associated with a first device may interfere with communications associated with a second device. In the example of wireless communications system 200, the UE 115-a may transmit uplink information to the base station 105-a during a same time period that the base station transmits downlink information to the UE 115-b. In some cases, the uplink information from the UE 115-a to the base station 105-a may interfere with the downlink information from the base station 105-a to the UE 115-b, for example, due to the UE 115-a and the UE 115-b being within a defined proximity of one another.

The CLI framework may require configured additional uplink (e.g. SRS) resources to measure CLI among UEs, which will increase overhead for measurement/report and may also affect UE power and interference. For example, the base station 105-a may configure both the UE 115-a and the UE 115-b with SRS resources associated with a CLI measurement procedure. In such examples, the base station 105-a may configure the UE 115-a to transmit an SRS during a set of time-frequency resources and may configure the UE 115-b to perform a channel measurement (e.g., reference signal received power (RSRP)) on the set of time-frequency resources to determine CLI between communications of the base station 105-a and the UE 115-a and communications of the base station 105-a and the UE 115-b. In some cases, it may be beneficial to minimize the usage of CLI measurements, reports, or the like, via side info. That is, mitigating overhead associated with CLI determination may result in increased communication efficiency, power savings, among other communication gains.

In some examples, a UE 115 may report, to a base station 105, one or more detected neighbor UEs in close proximity, based on which base station 105 may refrain from scheduling the reporting UE 115 and any reported neighbor UE 115 for full duplex communications, without additional CLI measurement (e.g., associated with measuring SRS). For example, the UE 115-a may be configured to detect proximal UEs 115 and may transmit a report 205 to the base station 105 indicating that the proximal UEs 115 are estimated to be within a defined proximity of the UE 115-a. In the example of wireless communications system 200, the UE 115-a may detect that UE 115-b is within the coverage area 110-c corresponding to the UE 115-a and may transmit the report 205 to the base station 105-a based on detecting the UE 115-b within the coverage area 110-c. In some examples, the UE 115-a may refrain from indicating the UE 115-c in the report, for example, based on detecting that the UE 115-c is outside of the coverage area 110-c. In some examples, the UE 115-a may detect sidelink messages (e.g., for resource reservation) associated with the proximal UEs 115. For example, the UE 115-b may transmit one or more sidelink control information SCI messages to reserve a sidelink channel and the UE 115-a may perform one or more measurements on the one or more SCI messages, where the UE 115-a may determine the UE 115-b to be within the coverage area 110-c. In some cases, the one or more SCI messages may be UE dedicated or group based. For example, the UE 115-b may transmit the one or more SCI messages indicating a resource reservation for only UE 115-b or, in some cases, the UE 115-b may transmit the one or more SCI messages indicating a resource reservation for multiple UEs 115.

In some examples, the UE 115-a may transmit the report 205, to the base station 105-a, indicating the detected UE 115-b based on a source ID in a received SCI whose RSRP exceeds a threshold. That is, the UE 115-b may transmit an SCI including a source ID corresponding to the UE 115-b, where the UE 115-a may receive the SCI, identify the UE 115-b based on the source ID, and perform a measurement of the SCI (e.g., RSRP measurement). The UE 115-a may transmit a report that includes the source ID in the report 205 when the RSRP of the SCI meets or exceeds the threshold, and may skip transmitting the report when the RSRP falls below the threshold. In such examples, SCIs may be reused for CLI determination, for example, to save the base station 105-a from configuring additional uplink (e.g., SRS) resources to enable the UEs 115 to measure CLI among UEs 115. In other words, configuring the UE 115-a to detect proximal UEs 115 based on measuring sidelink messages (e.g., SCIs) may mitigate signaling and resource overhead otherwise associated with CLI determination, for example, in cases where UE 115-b may transmit SRS during a set of time-frequency resources and UE 115-a may measure the SRS for CLI determination. In this way, overhead may be reduced for measuring and reporting CLI. In some examples, the base station 105-a may configure and signal the threshold to the UEs 115.

In some examples, the report 205 may further include transmitting UE 115 and receiving UE 115 one or more measured beam IDs, one or more panel IDs, or both. For example, the UE 115-a may transmit the report 205 including a beam ID, a panel ID, or both, that the UE 115-*a* used to measure one or more sidelink messages (e.g., SCIs) from the UE 115-*b*. Additionally or alternatively, the UE 115-*a* may transmit the report 205 including a beam ID, a panel ID, or both that the UE 115-*b* used to transmit the one or more sideline messages (e.g., SCIs). For example, a sidelink message may indicate the beam ID, the panel ID, or both, that the UE 115-*b* used to transmit the sidelink message. In such cases, the base station 105-*a* may decide whether a beam (e.g., indicated in the report 205) is the beam causing CLI. For example, the base station 105-*a* may decide whether a transmitting beam from the UE 115-*b* is a beam causing CLI to a receiving beam at the UE 115-*a* when communicating to the base station 105-*a*.

The base station 105-*a* may receive the sidelink assisted report 205 and may determine a communication scheme for the UEs 115. In some examples, the base station 105-*a* may avoid scheduling full duplex communications with the UE 115-*b* and the UE 115-*a*. For example, the report 205 may indicate that the UE 115-*b* is in the defined proximity to the UE 115-*a* and the base station 105-*a* may refrain from scheduling the UE 115-*a* and the UE 115-*b* for full duplex communications based on receiving the report 205. In such examples, the base station 105-*a* may refrain from scheduling the UE 115-*a* and the UE 115-*b* for full duplex communications as CLI between communications with the UE 115-*a* and communications with the UE 115-*b* may result in poor communication quality. In some examples, the base station 105-*a* may configure to use FDM based full duplex communications with one or more guard tones for scheduling full duplex communications with the UEs 115. For example, the report 205 may indicate that the UE 115-*b* is in the defined proximity to the UE 115-*a*. As such, the base station 105-*a* may transmit control information 210 to the UE 115-*a* and the UE 115-*b* indicating one or more frequency division multiplexed (FDMed) subbands 215 separated by one or more guard bands 220, where a subband 215-*a* (e.g., a first frequency resource) and a subband 215-*b* (e.g., a second frequency resource) may be distinct frequency resources (e.g., different frequency bands, different bandwidth parts, etc.) and may occur in a same TTI (e.g., a same symbol period, mini-slot, slot, subframe, frame, among other time intervals). As such, the base station 105-*a* may configure to use FDMed based full duplexing with a guard band (e.g., one or more guard tones) for scheduling full duplexing communication with UE 115-*a* and 115-*b* experiencing CLI due to their proximity.

In such examples, the UE 115-*a* may be configured to transmit information to the base station 105-*a* using subband 215-*a* and the UE 115-*b* may be configured to contemporaneously receive information from the base station 105-*a* using subband 215-*b*. In another example, the UE 115-*a* may be configured to receive information from the base station 105-*a* using subband 215-*a* and the UE 115-*b* may be configured to contemporaneously transmit information to the base station 105-*a* using subband 215-*b*. Thus, the base station 105-*a* may support full duplex communication in a time period with UEs 115-*a* and 115-*b* in frequency ranges (e.g., subband 215-*a* and 215-*b*) that are separated in frequency by a guard band or by one or more guard tones. Configuring the UE 115-*a* to detect proximal UEs based on performing measurements on transmitted SCIs may mitigate overhead otherwise associated with CLI determination, for example, in cases where the UE 115-*b* may transmit SRS during a set of time-frequency resources and the UE 115-*a* may measure the SRS for CLI determination. In this way, overhead may be reduced for measuring and reporting CLI.

Figure 3:
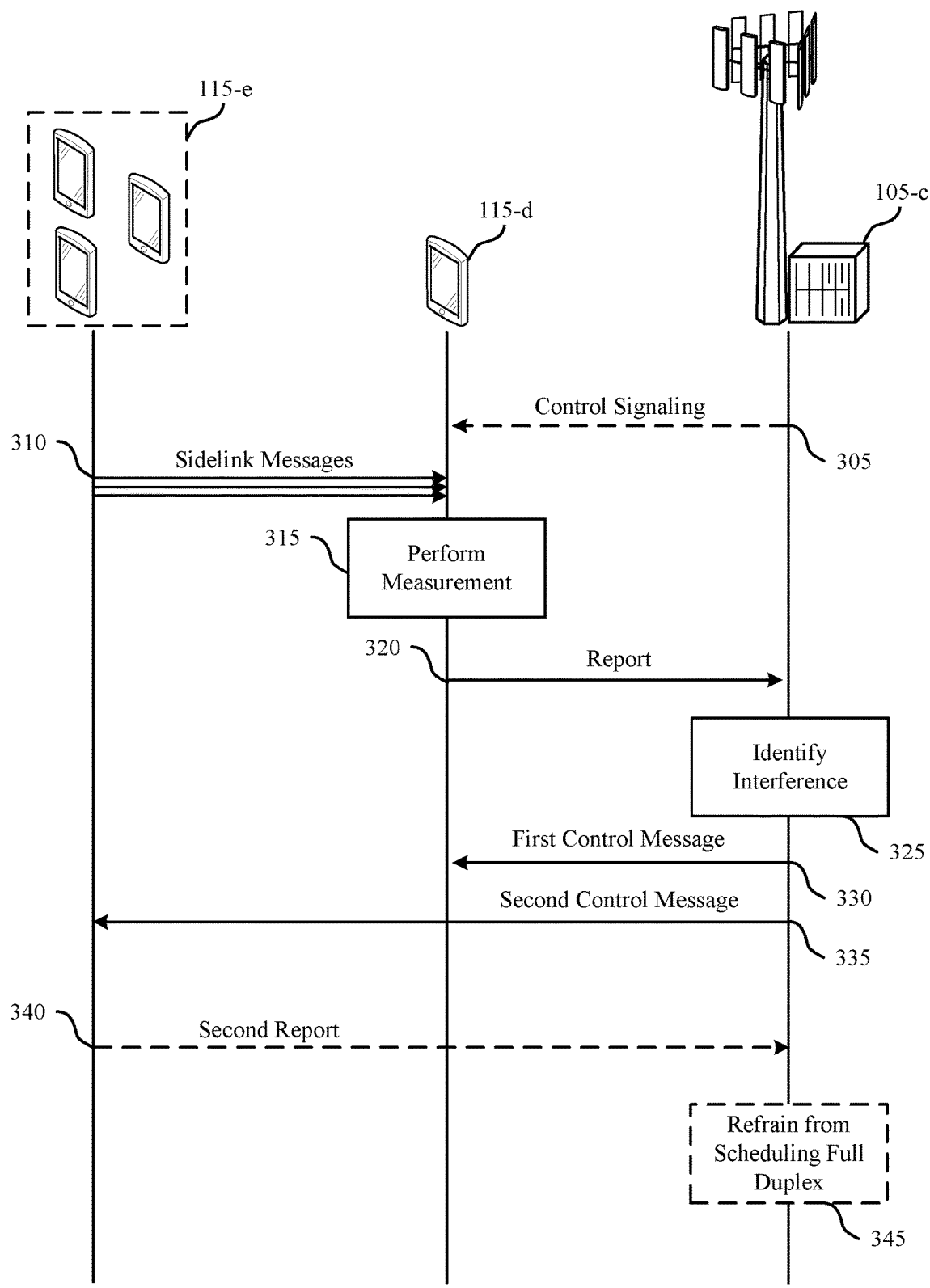
FIG. 3 illustrates an example of a process flow that supports sidelink assisted CLI determination in accordance with aspects of the present disclosure.

FIG. 3 illustrates an example of a process flow 300 that supports sidelink assisted CLI determination in accordance with aspects of the present disclosure. In some examples, the process flow 300 may implement aspects of wireless communications systems 100 or 200. For example, process flow 300 may include UE 115-*d*, one or more UEs 115-*e*, and base station 105-*c*, which may be examples of corresponding devices as described with reference to FIGS. 1 and 2. In some examples, the UE 115-*d* may perform measurements on sidelink messages from one or more other wireless devices (e.g., one or more UEs 115-*e*) and may report proximal devices to the base station 105-*c*, where the base station 105-*c* may determine whether to schedule full duplex communications based on the reporting.

In the following description of the process flow 300, the operations may be performed (e.g., reported or provided) in a different order than the order shown, or the operations performed by the UE 115-*d*, the one or more UEs 115-*e*, and the base station 105-*c* may be performed in different orders or at different times. For example, specific operations also may be left out of the process flow 300, or other operations may be added to the process flow 300. Further, although some operations or signaling may be shown to occur at different times for discussion purposes, these operations may actually occur at the same time.

At 310, the one or more UEs 115-*e* may transmit sidelink messages, for example, as resource reservations. As such the UE 115-*d* may monitor a sidelink channel for such sidelink messages and may receive the sidelink messages.

At 315, the UE 115-*e* may perform a first measurement of a sidelink message received from a second wireless device. In some cases, the sidelink message may be one of the sidelink messages received at 310. Further, the sidelink messages may be SCI messages, and in some examples, may be UE dedicated SCI or group based SCI. In some examples, the UE 115-*d* may monitor a sidelink channel for resource reservations, where the sidelink message is a resource reservation received from the second wireless device via the sidelink channel based at least in part on the monitoring. In some cases, the first measurement may be an RSRP measurement, an interference measurement, a CLI measurement, a received signal strength indicator, an SNR measurement, a signal to interference plus noise ratio (SINR) measurement, or any combination thereof.

At 320, the UE 115-*d* may transmit, to the base station 105-*c*, a report indicating that the second wireless device is estimated to be within a defined proximity of the UE 115-*d* based at least in part on the first measurement satisfying a threshold. In some cases, at 305, the UE 115-*d* may receive control signaling indicating the threshold. In some examples, the threshold may be an RSRP threshold. In some cases, the UE 115-*d* may transmit the report indicating the first measurement. For example, the UE 115-*d* may include the first measurement in the report. In some cases, the UE 115-*d* may transmit the report indicating a source identifier of the second wireless device. That is, the UE 115-*d* may identify a source identifier from the received sidelink message and may indicate the source identifier in the report. In some examples, the UE 115-*e* may transmit the report indicating a measured beam identifier, a panel identifier, or both, for example, as described with reference to FIG. 2. The UE 115-*e* may transmit the report periodically, semi-persistently, or aperiodically.

In some cases, at 305, the base station 105-*c* may transmit, and the UE 115-*d* may receive control signaling indicating a trigger for transmitting the report when a neighbor UE 115 is estimated to be within the defined proximity of the UE 115-*d*. In some examples, the control signaling may indicate a deactivation trigger indicating that the UE 115-*d* is to refrain from transmitting a second (e.g., subsequent) report. Additionally or alternatively, the control signaling may indicate a trigger for transmitting the report in accordance with a measurement satisfying the threshold.

At 325, the base station 105-*c* may identify interference based on the report received at 320. For example, the base station 105-*c* may identify interference associated with the one or more identifiers, where the base station may schedule transmission of a first message (e.g., from UE 115-*d*) and schedule transmission of a second message (e.g., from the second wireless device) based on identifying the interference.

At 330, the base station 105-*c* may transmit a first control message to the UE 115-*d* scheduling transmission of a first message between the base station and the UE 115-*d* in a first frequency resource. Further, at 335, the base station 105-*c* may transmit a second control message to the second wireless device scheduling transmission of a second message between the base station 105-*c* and the second wireless device in a second frequency resource, where the first frequency resource and the second frequency resource are distinct frequency resources and occur in a same TTI. That is, the base station may schedule full duplex communications with the UE 115-*d* and the second wireless device. In some examples, the first frequency resource and the second frequency resource are separated by one or more guard tones, one or more resource elements, a frequency range, or any combination thereof. In some cases, the first frequency resource and the second frequency resource occur within a same BWP.

In some cases, at 340, the base station 105-*c* may receive, from a third wireless device, a second report indicating that a fourth wireless device is estimated to be within a defined proximity of the third wireless device.

In some cases, at 345, the base station 105-*c* may refrain from scheduling full duplex communication with the third wireless device, the fourth wireless device, or both, based at least in part on the second report.

Figure 4:
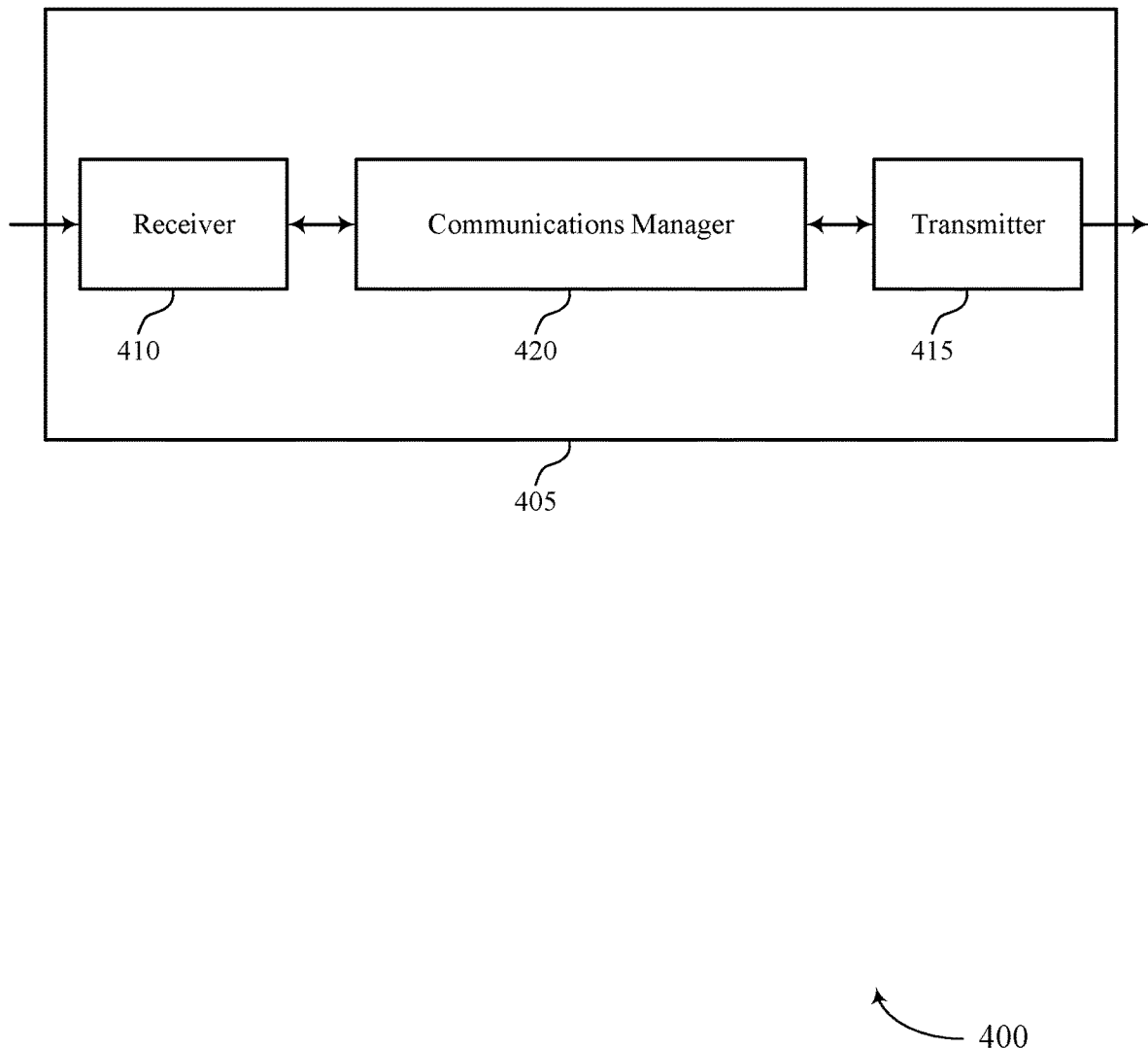
FIGS. 4 and 5 show block diagrams of devices that support sidelink assisted CLI determination in accordance with aspects of the present disclosure.

FIG. 4 shows a block diagram 400 of a device 405 that supports sidelink assisted CLI determination in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to sidelink assisted CLI determination). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to sidelink assisted CLI determination). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of sidelink assisted CLI determination as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first wireless device in accordance with examples as disclosed herein. For example, the communications manager 420 may be configured as or otherwise support a means for performing a first measurement of a sidelink message received from a second wireless device. The communications manager 420 may be configured as or otherwise support a means for transmitting, to a base station, a report indicating that the second wireless device is estimated to be within a defined proximity of the first wireless device based on the first measurement satisfying a threshold. The communications manager 420 may be configured as or otherwise support a means for receiving a control message, from the base station, scheduling transmission of a message between the base station and the first wireless device in a frequency resource in response to the report indicating that the second wireless device is estimated to be within the defined proximity of the first wireless device.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reporting proximal wireless devices to a base station as part of a CLI determination procedure, resulting in reduced processing, reduced power consumption, and more efficient utilization of communication resources.

Figure 5:
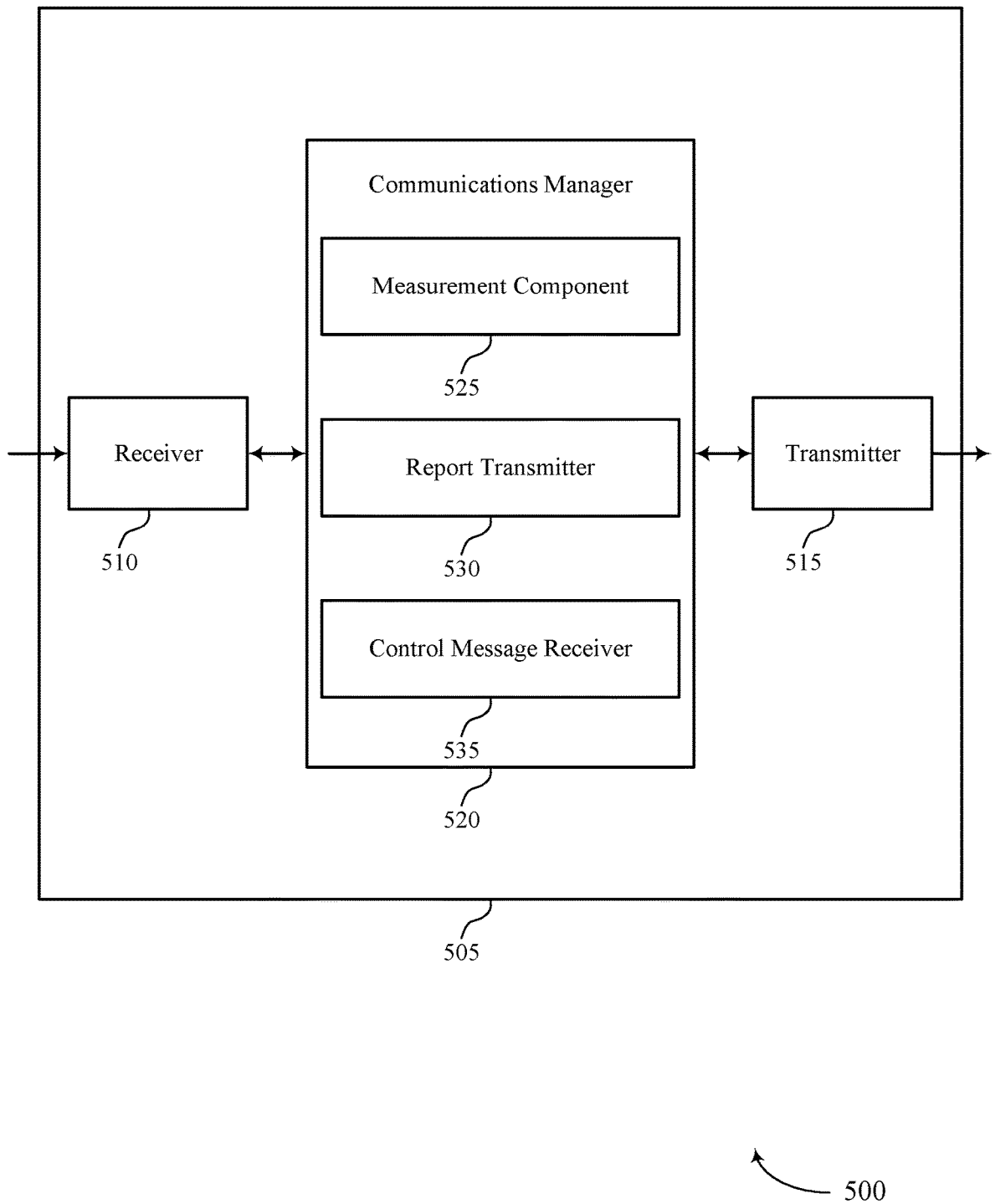

FIG. 5 shows a block diagram 500 of a device 505 that supports sidelink assisted CLI determination in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink assisted CLI determination). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink assisted CLI determination). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of sidelink assisted CLI determination as described herein. For example, the communications manager 520 may include a measurement component 525, a report transmitter 530, a control message receiver 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. The measurement component 525 may be configured as or otherwise support a means for performing a first measurement of a sidelink message received from a second wireless device. The report transmitter 530 may be configured as or otherwise support a means for transmitting, to a base station, a report indicating that the second wireless device is estimated to be within a defined proximity of the first wireless device based on the first measurement satisfying a threshold. The control message receiver 535 may be configured as or otherwise support a means for receiving a control message, from the base station, scheduling transmission of a message between the base station and the first wireless device in a frequency resource in response to the report indicating that the second wireless device is estimated to be within the defined proximity of the first wireless device.

Figure 6:
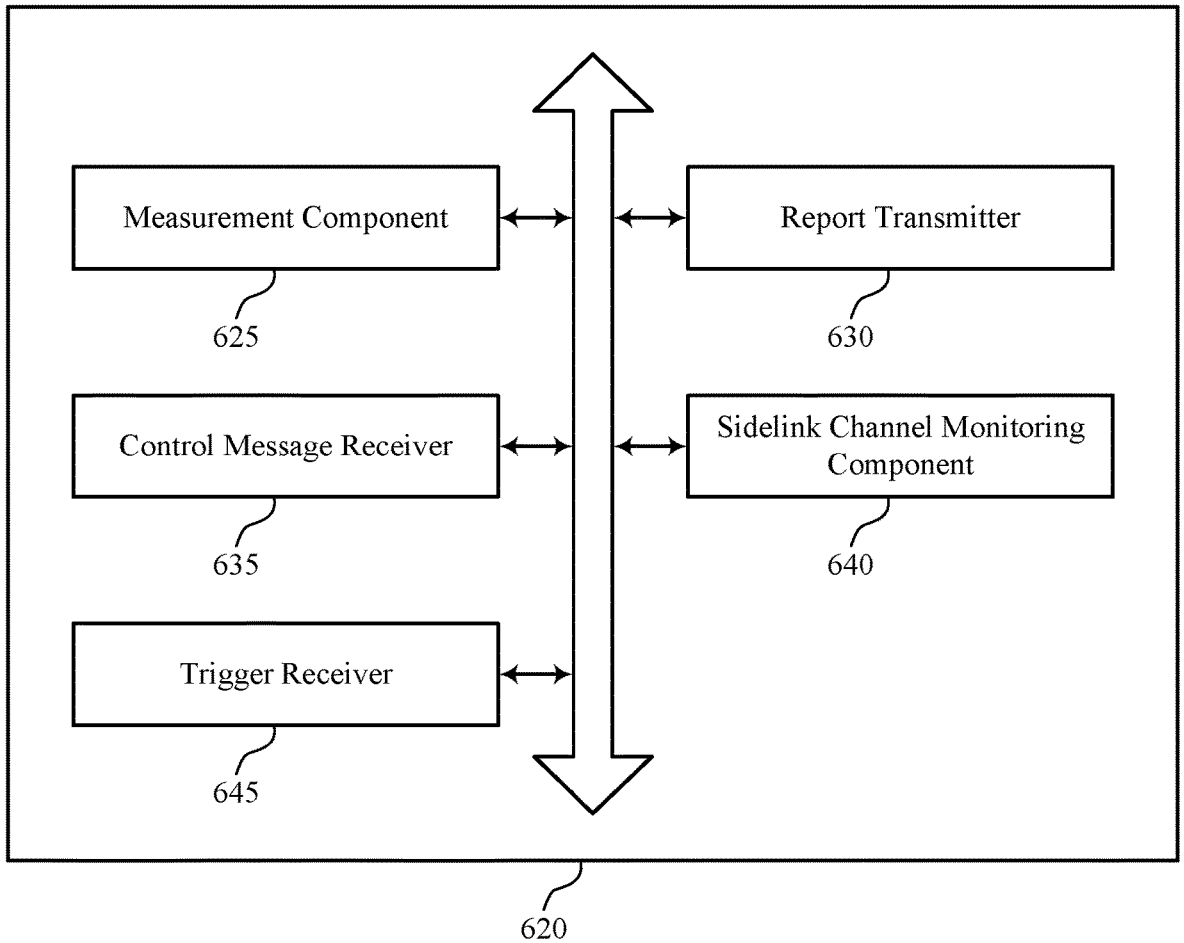
FIG. 6 shows a block diagram of a communications manager that supports sidelink assisted CLI determination in accordance with aspects of the present disclosure.

FIG. 6 shows a block diagram 600 of a communications manager 620 that supports sidelink assisted CLI determination in accordance with aspects of the present disclosure. The communications manager 620 may be an example of aspects of a communications manager 420, a communications manager 520, or both, as described herein. The communications manager 620, or various components thereof, may be an example of means for performing various aspects of sidelink assisted CLI determination as described herein. For example, the communications manager 620 may include a measurement component 625, a report transmitter 630, a control message receiver 635, a sidelink channel monitoring component 640, a trigger receiver 645, or any combination thereof. Each of these components may communicate, directly or indirectly, with one another (e.g., via one or more buses).

The communications manager 620 may support wireless communication at a first wireless device in accordance with examples as disclosed herein. The measurement component 625 may be configured as or otherwise support a means for performing a first measurement of a sidelink message received from a second wireless device. The report transmitter 630 may be configured as or otherwise support a means for transmitting, to a base station, a report indicating that the second wireless device is estimated to be within a defined proximity of the first wireless device based on the first measurement satisfying a threshold. The control message receiver 635 may be configured as or otherwise support a means for receiving a control message, from the base station, scheduling transmission of a message between the base station and the first wireless device in a frequency resource in response to the report indicating that the second wireless device is estimated to be within the defined proximity of the first wireless device.

In some examples, the report transmitter 630 may be configured as or otherwise support a means for transmitting the report indicating the first measurement.

In some examples, the sidelink channel monitoring component 640 may be configured as or otherwise support a means for monitoring a sidelink channel for resource reservations, where the sidelink message is a resource reservation received from the second wireless device via the sidelink channel based on the monitoring.

In some examples, the report transmitter 630 may be configured as or otherwise support a means for transmitting the report indicating a source identifier of the second wireless device.

In some examples, the control message receiver 635 may be configured as or otherwise support a means for receiving, from the base station, control information indicating the threshold. In some examples, the threshold includes a reference signal received power threshold.

In some examples, the report transmitter 630 may be configured as or otherwise support a means for transmitting the report indicating a measured beam identifier, a panel identifier, or both. In some examples, the report transmitter 630 may be configured as or otherwise support a means for transmitting the report periodically, semi-persistently, or aperiodically.

In some examples, the trigger receiver 645 may be configured as or otherwise support a means for receiving control signaling indicating a trigger for transmitting the report when a neighbor UE is estimated to be within the defined proximity of the first wireless device.

In some examples, the trigger receiver 645 may be configured as or otherwise support a means for receiving control signaling indicating a deactivation trigger indicating that the first wireless device is to refrain from transmitting a second report.

In some examples, the control message receiver 635 may be configured as or otherwise support a means for receiving control signaling indicating a trigger for transmitting the report in accordance with a measurement satisfying the threshold.

In some examples, the first measurement is a reference signal received power measurement, an interference measurement, a cross link interference measurement, a received signal strength indicator, a signal to noise ratio measurement, a signal to interference plus noise ratio measurement, or any combination thereof.

In some examples, the sidelink message is a UE dedicated sidelink control information message or a group based sidelink control information message.

Figure 7:
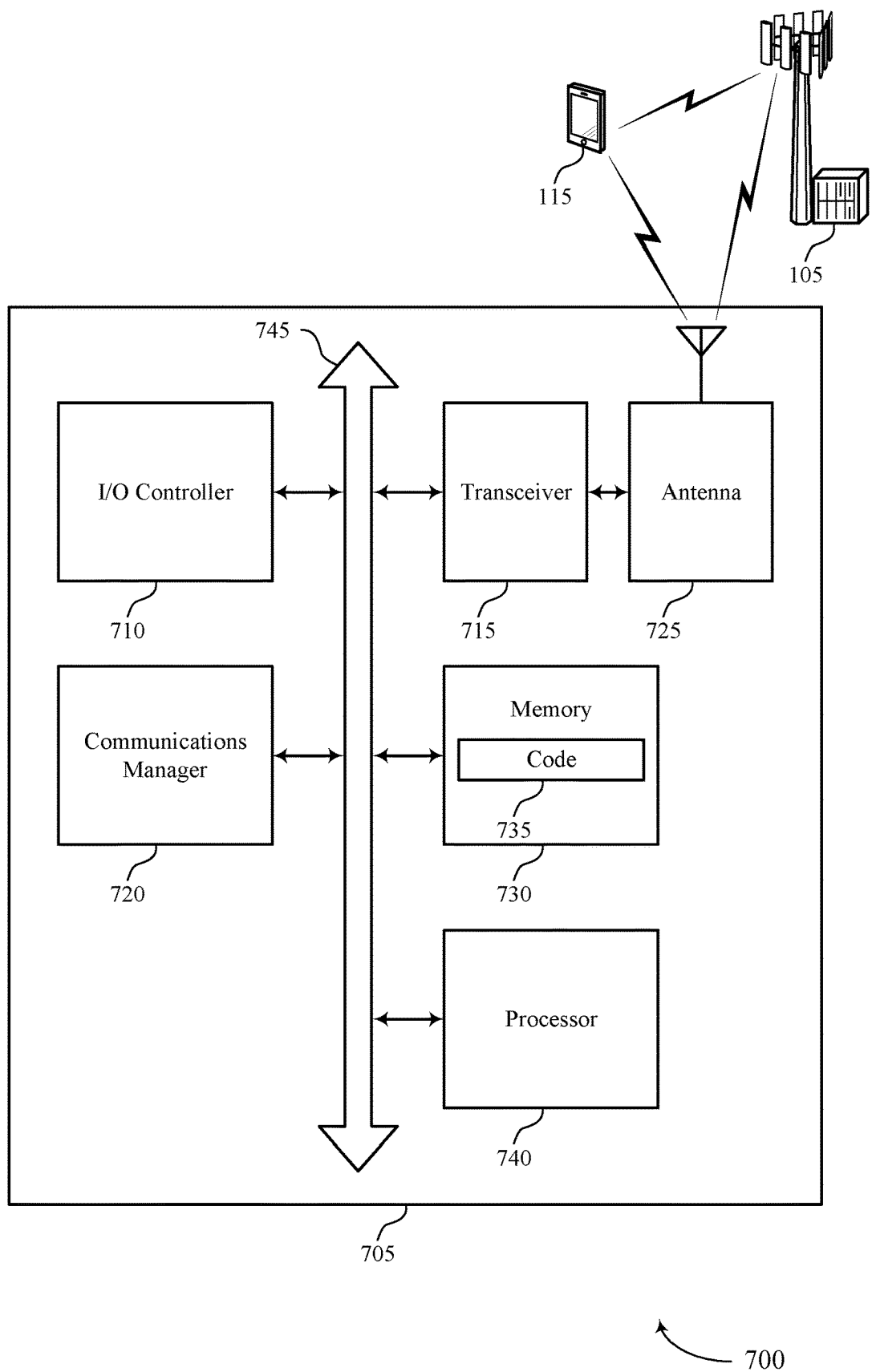
FIG. 7 shows a diagram of a system including a device that supports sidelink assisted CLI determination in accordance with aspects of the present disclosure.

FIG. 7 shows a diagram of a system 700 including a device 705 that supports sidelink assisted CLI determination in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting sidelink assisted CLI determination). For example, the device 705 or a component of the device 705 may include a processor 740 and memory 730 coupled to the processor 740, the processor 740 and memory 730 configured to perform various functions described herein.

The communications manager 720 may support wireless communication at a first wireless device in accordance with examples as disclosed herein. For example, the communications manager 720 may be configured as or otherwise support a means for performing a first measurement of a sidelink message received from a second wireless device. The communications manager 720 may be configured as or otherwise support a means for transmitting, to a base station, a report indicating that the second wireless device is estimated to be within a defined proximity of the first wireless device based on the first measurement satisfying a threshold. The communications manager 720 may be configured as or otherwise support a means for receiving a control message, from the base station, scheduling transmission of a message between the base station and the first wireless device in a frequency resource in response to the report indicating that the second wireless device is estimated to be within the defined proximity of the first wireless device.

By including or configuring the communications manager 720 in accordance with examples as described herein, the device 705 may support techniques for reporting proximal wireless devices to a base station as part of a CLI determination procedure, resulting in improved communication reliability, reduced latency, reduced power consumption, more efficient utilization of communication resources, improved coordination between devices, improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of sidelink assisted CLI determination as described herein, or the processor 740 and the memory 730 may be otherwise configured to perform or support such operations.

Figure 8:
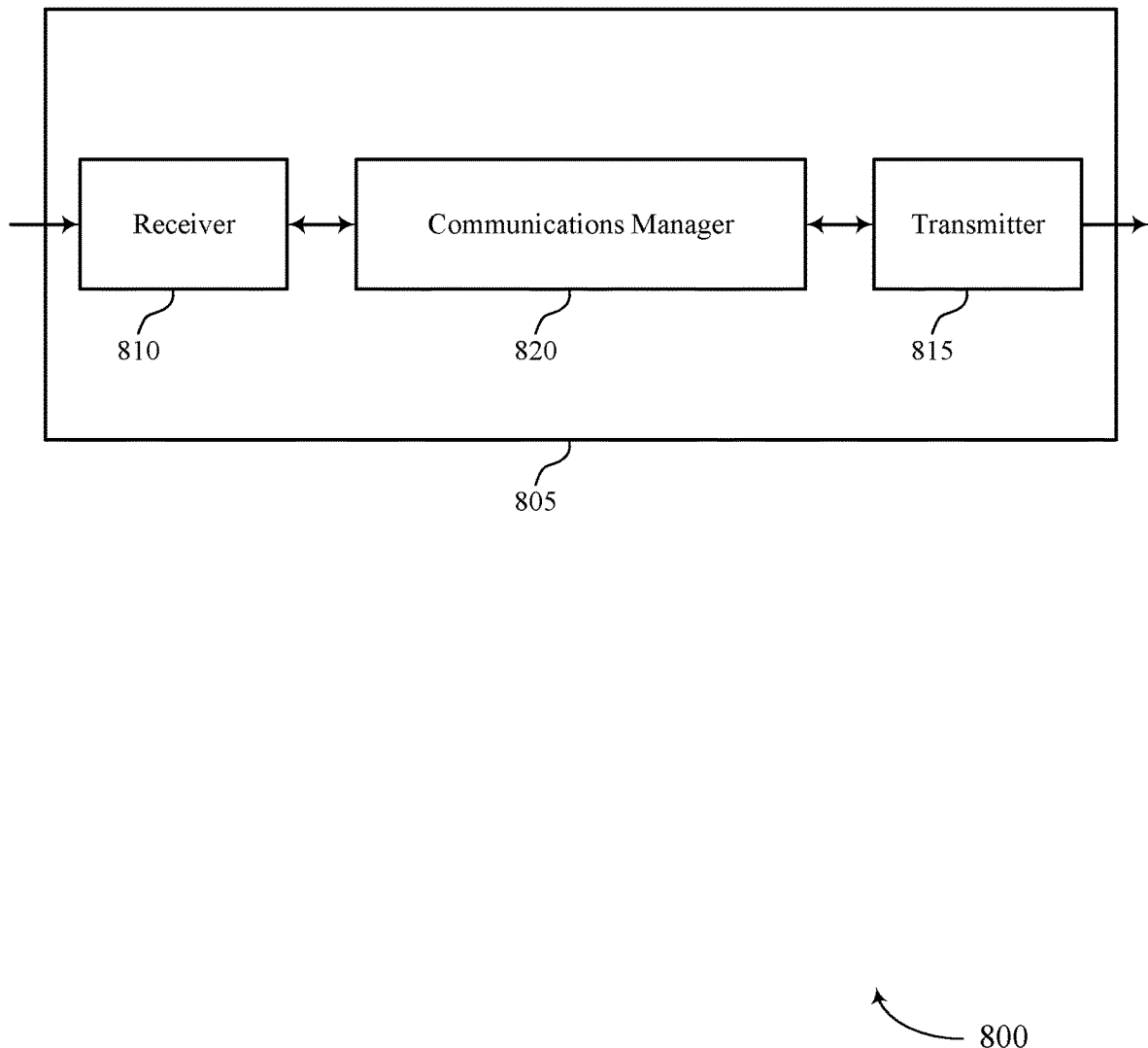
FIGS. 8 and 9 show block diagrams of devices that support sidelink assisted CLI determination in accordance with aspects of the present disclosure.

FIG. 8 shows a block diagram 800 of a device 805 that supports sidelink assisted CLI determination in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sidelink assisted CLI determination). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sidelink assisted CLI determination). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of sidelink assisted CLI determination as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for receiving, from a first wireless device, a report indicating that a second wireless device is estimated to be within a defined proximity of the first wireless device. The communications manager 820 may be configured as or otherwise support a means for transmitting a first control message to the first wireless device scheduling transmission of a first message between the base station and the first wireless device in a first frequency resource. The communications manager 820 may be configured as or otherwise support a means for transmitting a second control message to the second wireless device scheduling transmission of a second message between the base station and the second wireless device in a second frequency resource, where the first frequency resource and the second frequency resource are distinct frequency resources and occur in a same transmission time interval.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for receiving a report of wireless devices proximal to a UE as part of a CLI determination procedure, resulting in reduced processing, reduced power consumption, more efficient utilization of communication resources.

Figure 9:
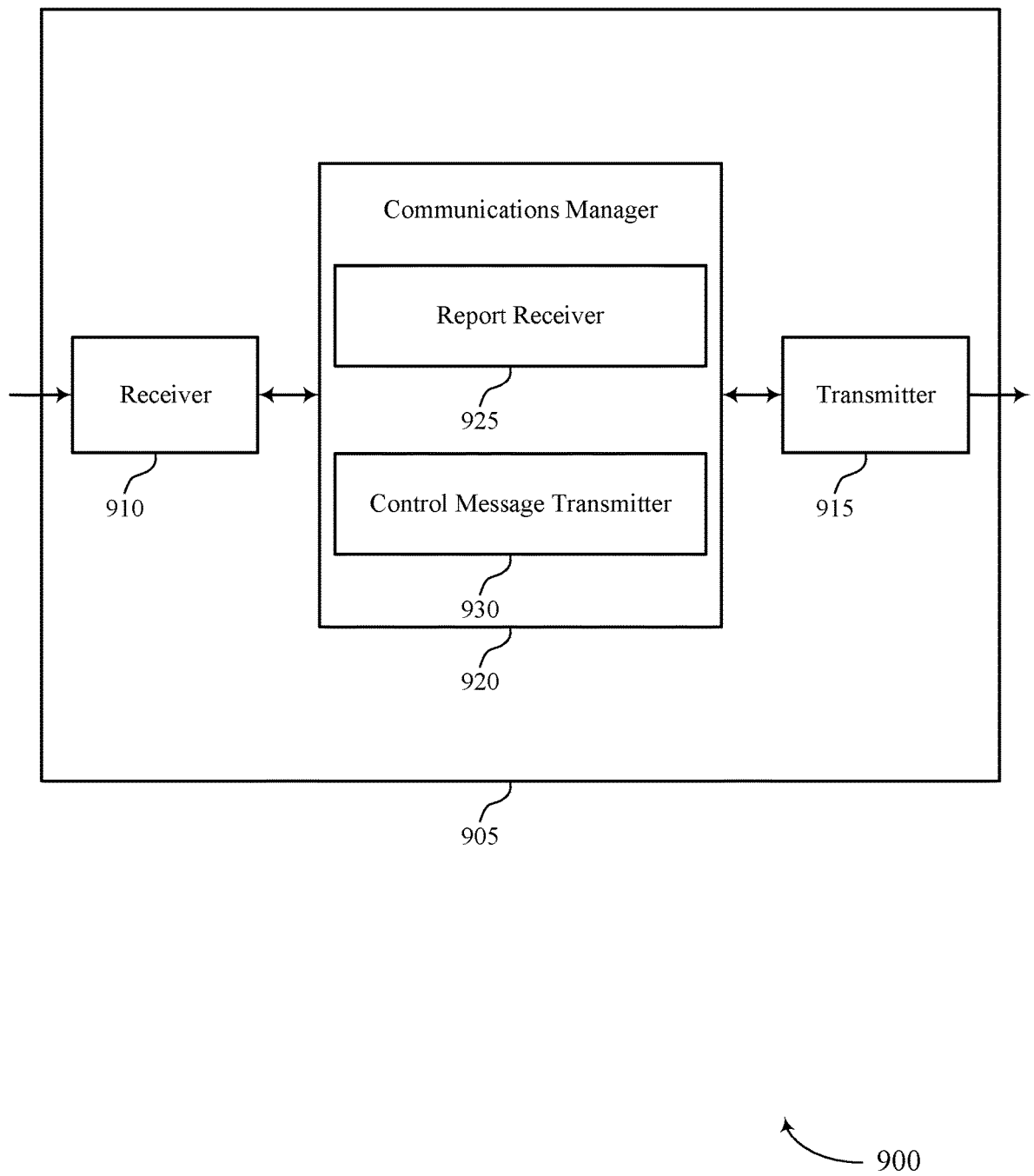

FIG. 9 shows a block diagram 900 of a device 905 that supports sidelink assisted CLI determination in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to sidelink assisted CLI determination). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to sidelink assisted CLI determination). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of sidelink assisted CLI determination as described herein. For example, the communications manager 920 may include a report receiver 925 a control message transmitter 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The report receiver 925 may be configured as or otherwise support a means for receiving, from a first wireless device, a report indicating that a second wireless device is estimated to be within a defined proximity of the first wireless device. The control message transmitter 930 may be configured as or otherwise support a means for transmitting a first control message to the first wireless device scheduling transmission of a first message between the base station and the first wireless device in a first frequency resource. The control message transmitter 930 may be configured as or otherwise support a means for transmitting a second control message to the second wireless device scheduling transmission of a second message between the base station and the second wireless device in a second frequency resource, where the first frequency resource and the second frequency resource are distinct frequency resources and occur in a same transmission time interval.

Figure 10:
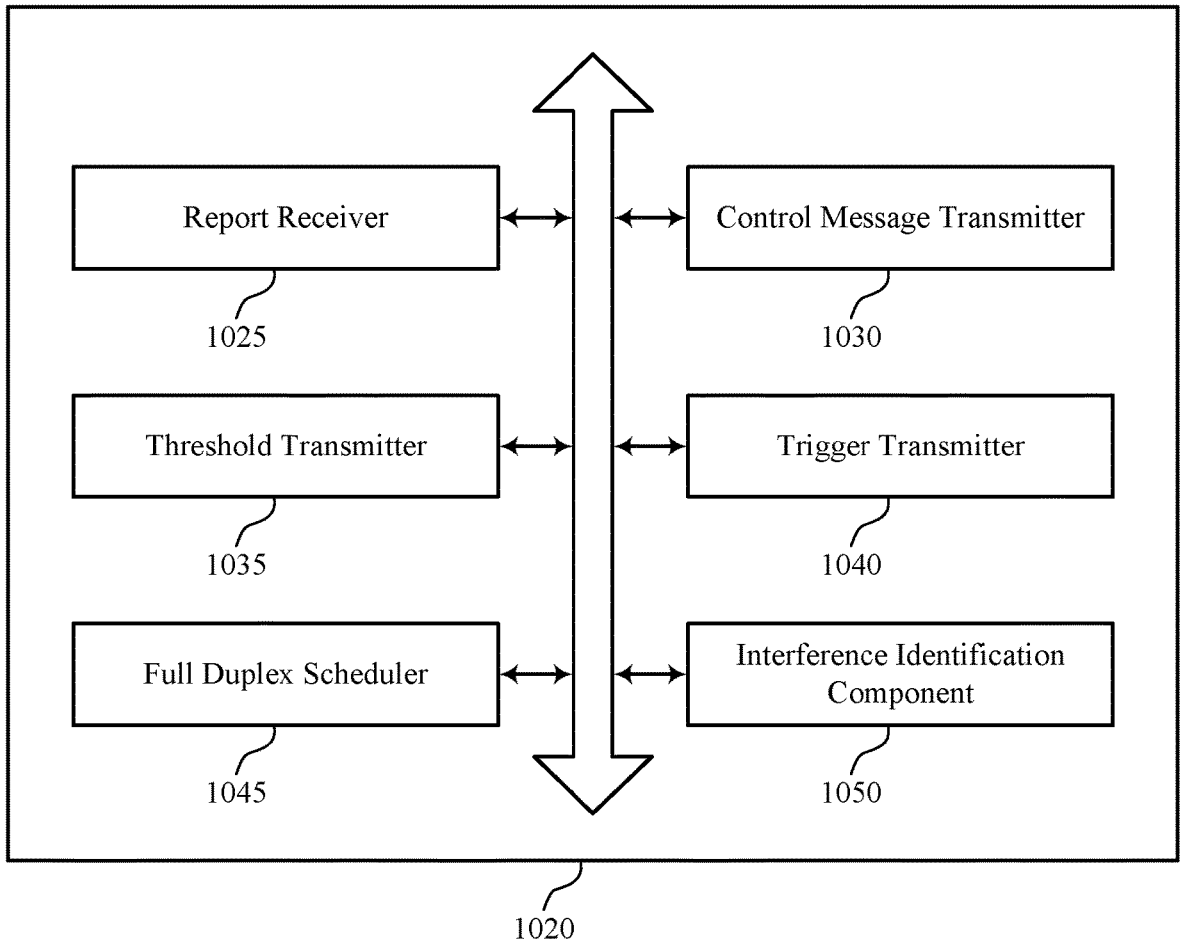
FIG. 10 shows a block diagram of a communications manager that supports sidelink assisted CLI determination in accordance with aspects of the present disclosure.

FIG. 10 shows a block diagram 1000 of a communications manager 1020 that supports sidelink assisted CLI determination in accordance with aspects of the present disclosure. The communications manager 1020 may be an example of aspects of a communications manager 820, a communications manager 920, or both, as described herein. The communications manager 1020, or various components thereof, may be an example of means for performing various aspects of sidelink assisted CLI determination as described herein. For example, the communications manager 1020 may include a report receiver 1025, a control message transmitter 1030, a threshold transmitter 1035, a trigger transmitter 1040, a full duplex scheduler 1045, an interference identification component 1050, or any combination thereof. Each of these components may communicate, directly or indirectly, with one another (e.g., via one or more buses).

The communications manager 1020 may support wireless communications at a base station in accordance with examples as disclosed herein. The report receiver 1025 may be configured as or otherwise support a means for receiving, from a first wireless device, a report indicating that a second wireless device is estimated to be within a defined proximity of the first wireless device. The control message transmitter 1030 may be configured as or otherwise support a means for transmitting a first control message to the first wireless device scheduling transmission of a first message between the base station and the first wireless device in a first frequency resource. In some examples, the control message transmitter 1030 may be configured as or otherwise support a means for transmitting a second control message to the second wireless device scheduling transmission of a second message between the base station and the second wireless device in a second frequency resource, where the first frequency resource and the second frequency resource are distinct frequency resources and occur in a same transmission time interval.

In some examples, the threshold transmitter 1035 may be configured as or otherwise support a means for transmitting, to the first wireless device, control information indicating a threshold associated with estimating wireless devices to be within the defined proximity of the first wireless device. In some examples, the threshold includes a reference signal received power threshold.

In some examples, the report receiver 1025 may be configured as or otherwise support a means for receiving the report including one or more identifiers corresponding to the first wireless device, the second wireless device, or a combination thereof. In some examples, the one or more identifiers include a measured beam identifier, a panel identifier, or a both.

In some examples, the interference identification component 1050 may be configured as or otherwise support a means for identifying interference associated with the one or more identifiers, where scheduling the transmission of the first message and scheduling the transmission of the second message is based on identifying the interference.

In some examples, the trigger transmitter 1040 may be configured as or otherwise support a means for transmitting control signaling indicating a trigger to transmit the report in accordance with estimating the second wireless device to be within the defined proximity of the first wireless device.

In some examples, the trigger transmitter 1040 may be configured as or otherwise support a means for transmitting control signaling indicating a deactivation trigger configuring the first wireless device to refrain from transmitting the report.

In some examples, the trigger transmitter 1040 may be configured as or otherwise support a means for transmitting control signaling indicating a trigger for transmitting the report in accordance with a measurement satisfying a threshold.

In some examples, the report receiver 1025 may be configured as or otherwise support a means for receiving the report indicating a first measurement, where transmitting the first control message and transmitting the second control message is based on the first measurement.

In some examples, the first measurement is a reference signal received power measurement, an interference measurement, a cross link interference measurement, a received signal strength indicator, a signal to noise ratio measurement, a signal to interference plus noise ratio measurement, or any combination thereof.

In some examples, the first frequency resource and the second frequency resource are separated by one or more guard tones, one or more resource elements, a frequency range, or any combination thereof. In some examples, the first frequency resource and the second frequency resource occur within a same bandwidth part.

In some examples, the report receiver 1025 may be configured as or otherwise support a means for receiving, from a third wireless device, a second report indicating that a fourth wireless device is estimated to be within a defined proximity of the third wireless device. In some examples, the full duplex scheduler 1045 may be configured as or otherwise support a means for refraining from scheduling full duplex communication with the third wireless device, the fourth wireless device, or both, based on the second report.

Figure 11:
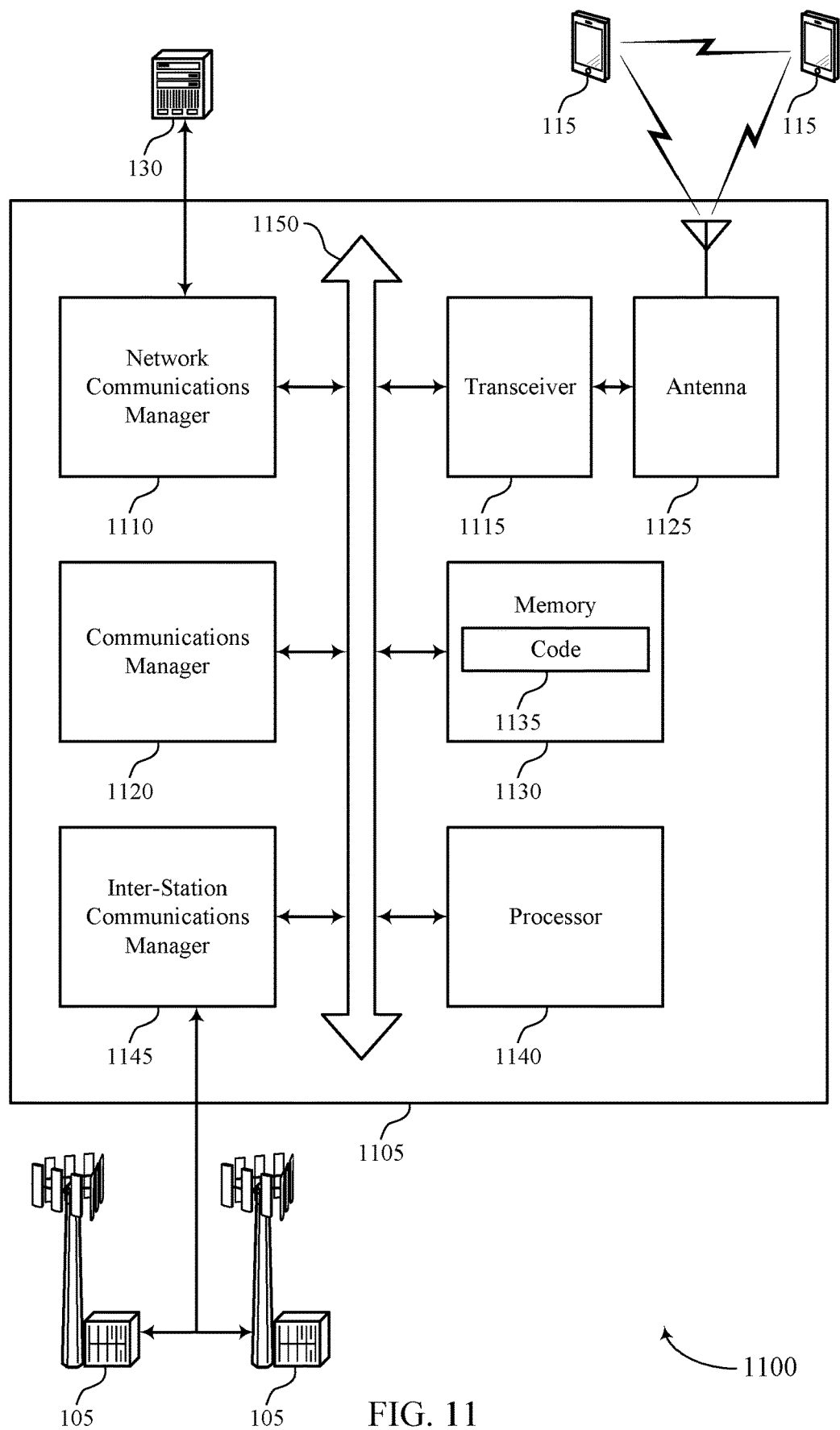
FIG. 11 shows a diagram of a system including a device that supports sidelink assisted CLI determination in accordance with aspects of the present disclosure.

FIG. 11 shows a diagram of a system 1100 including a device 1105 that supports sidelink assisted CLI determination in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting sidelink assisted CLI determination). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for receiving, from a first wireless device, a report indicating that a second wireless device is estimated to be within a defined proximity of the first wireless device. The communications manager 1120 may be configured as or otherwise support a means for transmitting a first control message to the first wireless device scheduling transmission of a first message between the base station and the first wireless device in a first frequency resource. The communications manager 1120 may be configured as or otherwise support a means for transmitting a second control message to the second wireless device scheduling transmission of a second message between the base station and the second wireless device in a second frequency resource, where the first frequency resource and the second frequency resource are distinct frequency resources and occur in a same transmission time interval.

By including or configuring the communications manager 1120 in accordance with examples as described herein, the device 1105 may support techniques for receiving a report of wireless devices proximal to a UE as part of a CLI determination procedure, resulting in improved communication reliability, reduced latency, reduced power consumption, more efficient utilization of communication resources, improved coordination between devices, improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of sidelink assisted CLI determination as described herein, or the processor 1140 and the memory 1130 may be otherwise configured to perform or support such operations.

Figure 12:
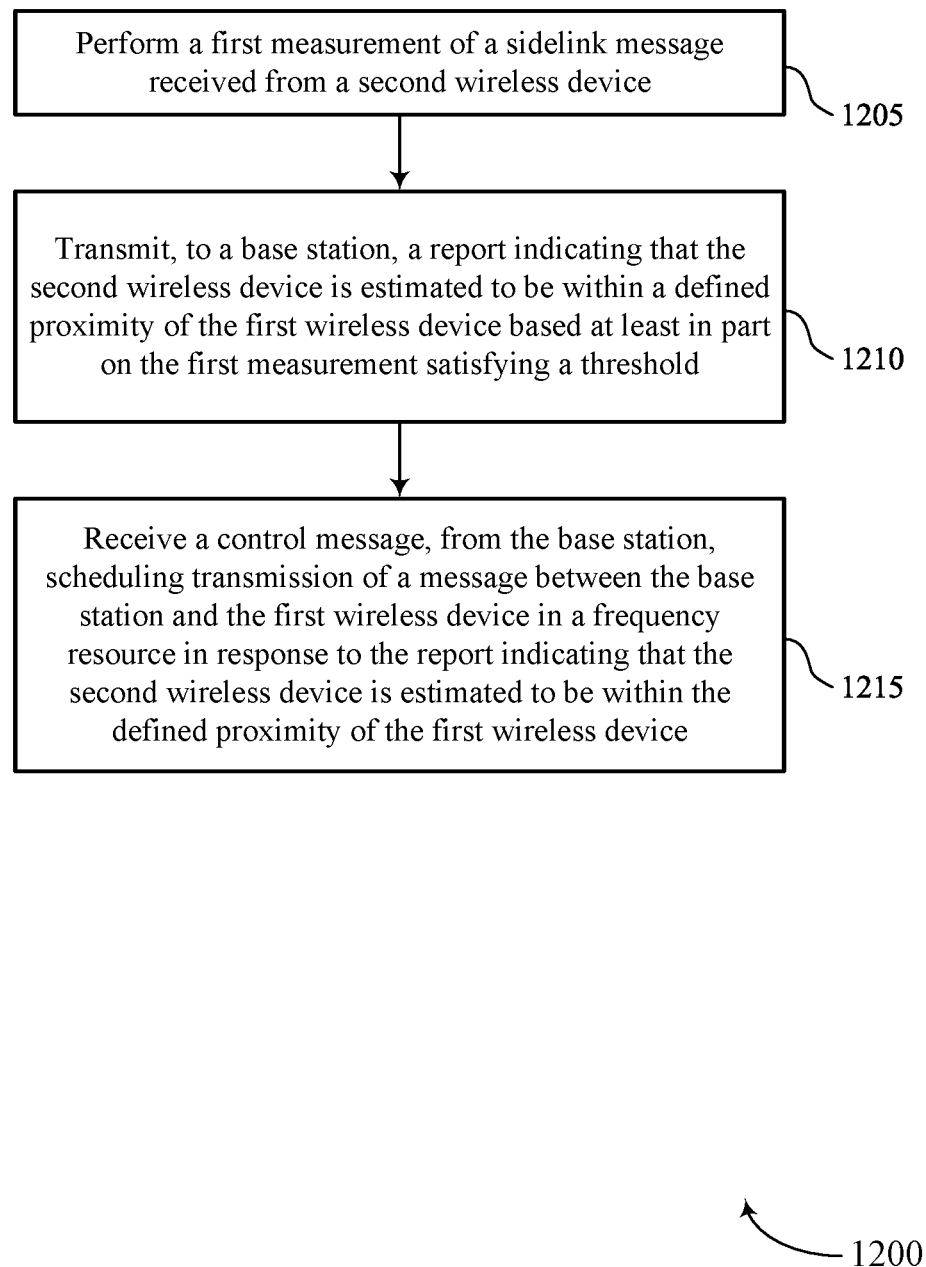
FIGS. 12 through 18 show flowcharts illustrating methods that support sidelink assisted CLI determination in accordance with aspects of the present disclosure.

FIG. 12 shows a flowchart illustrating a method 1200 that supports sidelink assisted CLI determination in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include performing a first measurement of a sidelink message received from a second wireless device. The operations of 1205 may be performed in accordance with examples as disclosed herein. In some examples, aspects of the operations of 1205 may be performed by a measurement component 625 as described with reference to FIG. 6.

At 1210, the method may include transmitting, to a base station, a report indicating that the second wireless device is estimated to be within a defined proximity of the first wireless device based on the first measurement satisfying a threshold. The operations of 1210 may be performed in accordance with examples as disclosed herein. In some examples, aspects of the operations of 1210 may be performed by a report transmitter 630 as described with reference to FIG. 6.

At 1215, the method may include receiving a control message, from the base station, scheduling transmission of a message between the base station and the first wireless device in a frequency resource in response to the report indicating that the second wireless device is estimated to be within the defined proximity of the first wireless device. The operations of 1215 may be performed in accordance with examples as disclosed herein. In some examples, aspects of the operations of 1215 may be performed by a control message receiver 635 as described with reference to FIG. 6.

Figure 13:
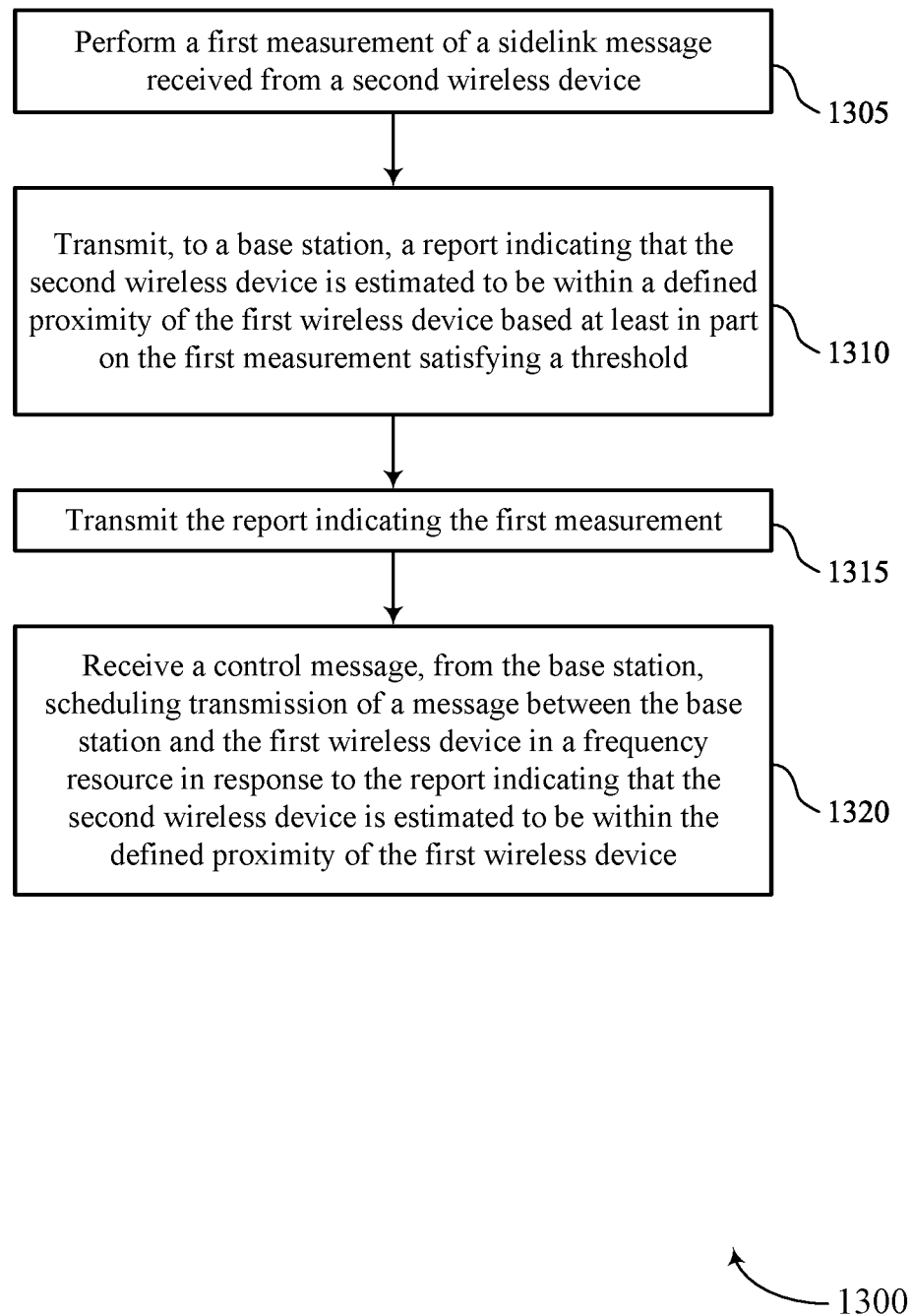

FIG. 13 shows a flowchart illustrating a method 1300 that supports sidelink assisted CLI determination in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include performing a first measurement of a sidelink message received from a second wireless device. The operations of 1305 may be performed in accordance with examples as disclosed herein. In some examples, aspects of the operations of 1305 may be performed by a measurement component 625 as described with reference to FIG. 6.

At 1310, the method may include transmitting, to a base station, a report indicating that the second wireless device is estimated to be within a defined proximity of the first wireless device based on the first measurement satisfying a threshold. The operations of 1310 may be performed in accordance with examples as disclosed herein. In some examples, aspects of the operations of 1310 may be performed by a report transmitter 630 as described with reference to FIG. 6.

At 1315, the method may include transmitting the report indicating the first measurement. The operations of 1315 may be performed in accordance with examples as disclosed herein. In some examples, aspects of the operations of 1315 may be performed by a report transmitter 630 as described with reference to FIG. 6.

At 1320, the method may include receiving a control message, from the base station, scheduling transmission of a message between the base station and the first wireless device in a frequency resource in response to the report indicating that the second wireless device is estimated to be within the defined proximity of the first wireless device. The operations of 1320 may be performed in accordance with examples as disclosed herein. In some examples, aspects of the operations of 1320 may be performed by a control message receiver 635 as described with reference to FIG. 6.

Figure 14:
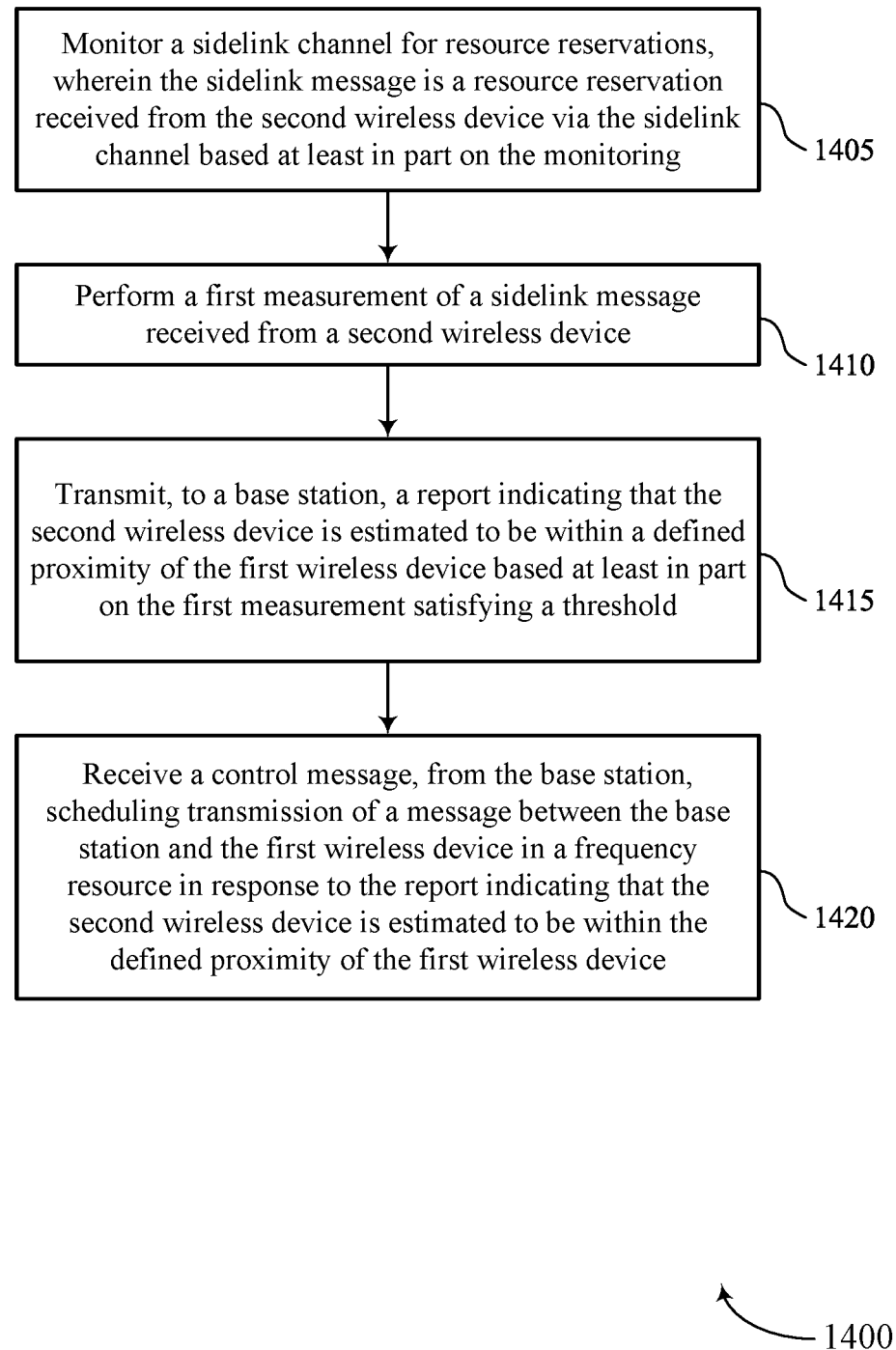

FIG. 14 shows a flowchart illustrating a method 1400 that supports sidelink assisted CLI determination in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include monitoring a sidelink channel for resource reservations, where the sidelink message is a resource reservation received from the second wireless device via the sidelink channel based on the monitoring. The operations of 1405 may be performed in accordance with examples as disclosed herein. In some examples, aspects of the operations of 1405 may be performed by a sidelink channel monitoring component 640 as described with reference to FIG. 6.

At 1410, the method may include performing a first measurement of a sidelink message received from a second wireless device. The operations of 1410 may be performed in accordance with examples as disclosed herein. In some examples, aspects of the operations of 1410 may be performed by a measurement component 625 as described with reference to FIG. 6.

At 1415, the method may include transmitting, to a base station, a report indicating that the second wireless device is estimated to be within a defined proximity of the first wireless device based on the first measurement satisfying a threshold. The operations of 1415 may be performed in accordance with examples as disclosed herein. In some examples, aspects of the operations of 1415 may be performed by a report transmitter 630 as described with reference to FIG. 6.

At 1420, the method may include receiving a control message, from the base station, scheduling transmission of a message between the base station and the first wireless device in a frequency resource in response to the report indicating that the second wireless device is estimated to be within the defined proximity of the first wireless device. The operations of 1420 may be performed in accordance with examples as disclosed herein. In some examples, aspects of the operations of 1420 may be performed by a control message receiver 635 as described with reference to FIG. 6.

Figure 15:
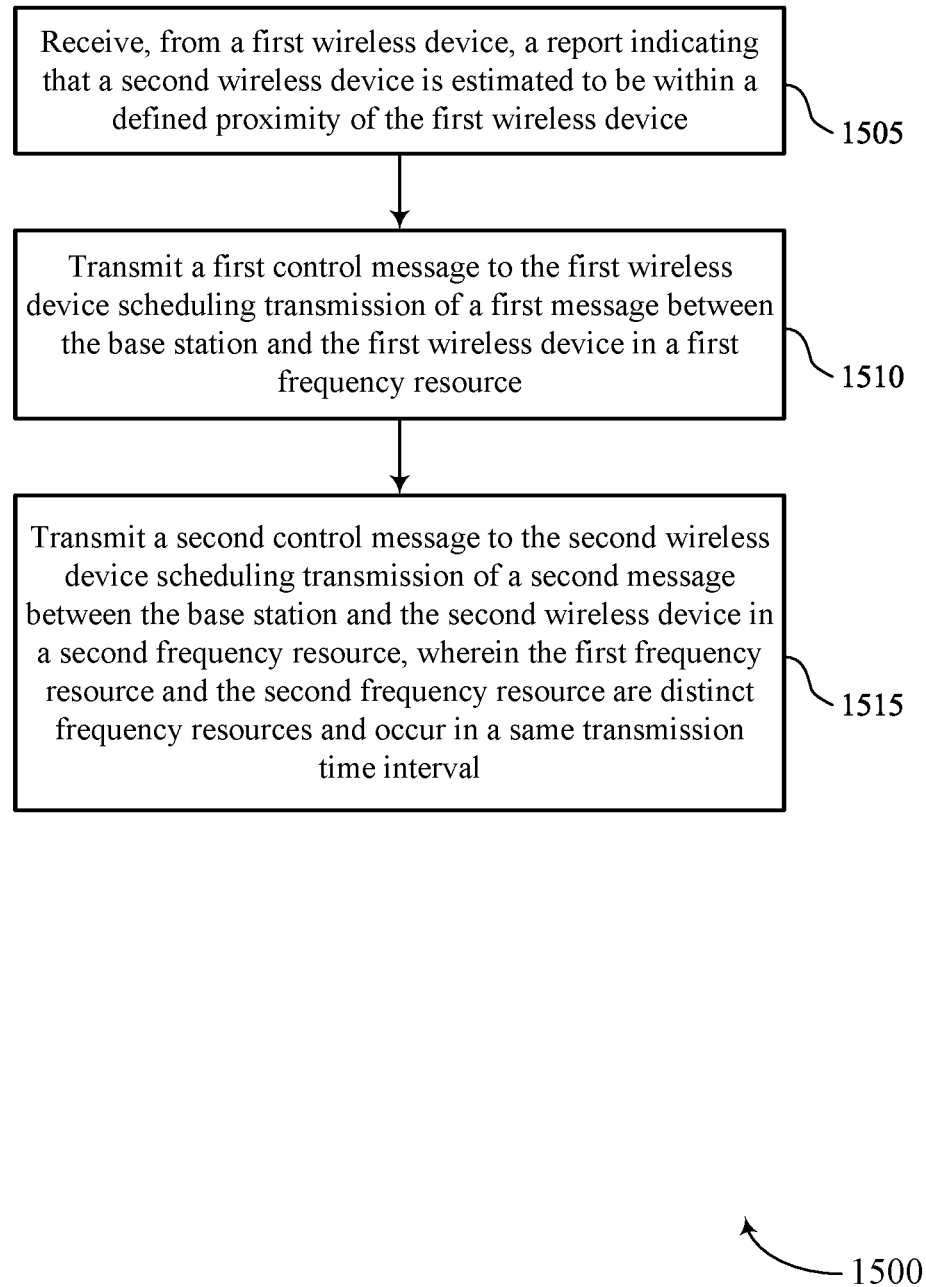

FIG. 15 shows a flowchart illustrating a method 1500 that supports sidelink assisted CLI determination in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from a first wireless device, a report indicating that a second wireless device is estimated to be within a defined proximity of the first wireless device. The operations of 1505 may be performed in accordance with examples as disclosed herein. In some examples, aspects of the operations of 1505 may be performed by a report receiver 1025 as described with reference to FIG. 10.

At 1510, the method may include transmitting a first control message to the first wireless device scheduling transmission of a first message between the base station and the first wireless device in a first frequency resource. The operations of 1510 may be performed in accordance with examples as disclosed herein. In some examples, aspects of the operations of 1510 may be performed by a control message transmitter 1030 as described with reference to FIG. 10.

At 1515, the method may include transmitting a second control message to the second wireless device scheduling transmission of a second message between the base station and the second wireless device in a second frequency resource, where the first frequency resource and the second frequency resource are distinct frequency resources and occur in a same transmission time interval. The operations of 1515 may be performed in accordance with examples as disclosed herein. In some examples, aspects of the operations of 1515 may be performed by a control message transmitter 1030 as described with reference to FIG. 10.

Figure 16:
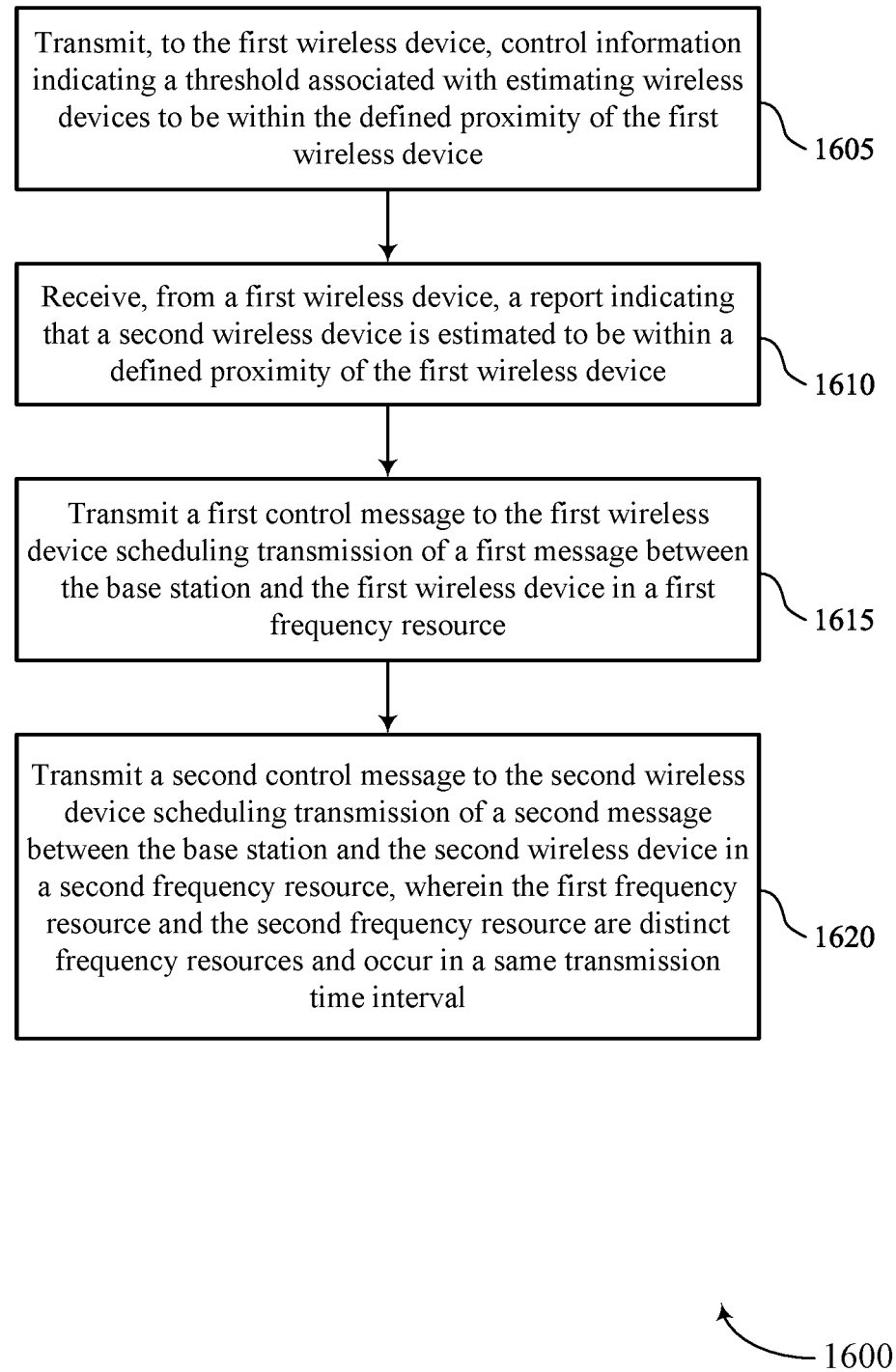

FIG. 16 shows a flowchart illustrating a method 1600 that supports sidelink assisted CLI determination in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting, to the first wireless device, control information indicating a threshold associated with estimating wireless devices to be within the defined proximity of the first wireless device. The operations of 1605 may be performed in accordance with examples as disclosed herein. In some examples, aspects of the operations of 1605 may be performed by a threshold transmitter 1035 as described with reference to FIG. 10.

At 1610, the method may include receiving, from a first wireless device, a report indicating that a second wireless device is estimated to be within a defined proximity of the first wireless device. The operations of 1610 may be performed in accordance with examples as disclosed herein. In some examples, aspects of the operations of 1610 may be performed by a report receiver 1025 as described with reference to FIG. 10.

At 1615, the method may include transmitting a first control message to the first wireless device scheduling transmission of a first message between the base station and the first wireless device in a first frequency resource. The operations of 1615 may be performed in accordance with examples as disclosed herein. In some examples, aspects of the operations of 1615 may be performed by a control message transmitter 1030 as described with reference to FIG. 10.

At 1620, the method may include transmitting a second control message to the second wireless device scheduling transmission of a second message between the base station and the second wireless device in a second frequency resource, where the first frequency resource and the second frequency resource are distinct frequency resources and occur in a same transmission time interval. The operations of 1620 may be performed in accordance with examples as disclosed herein. In some examples, aspects of the operations of 1620 may be performed by a control message transmitter 1030 as described with reference to FIG. 10.

Figure 17:
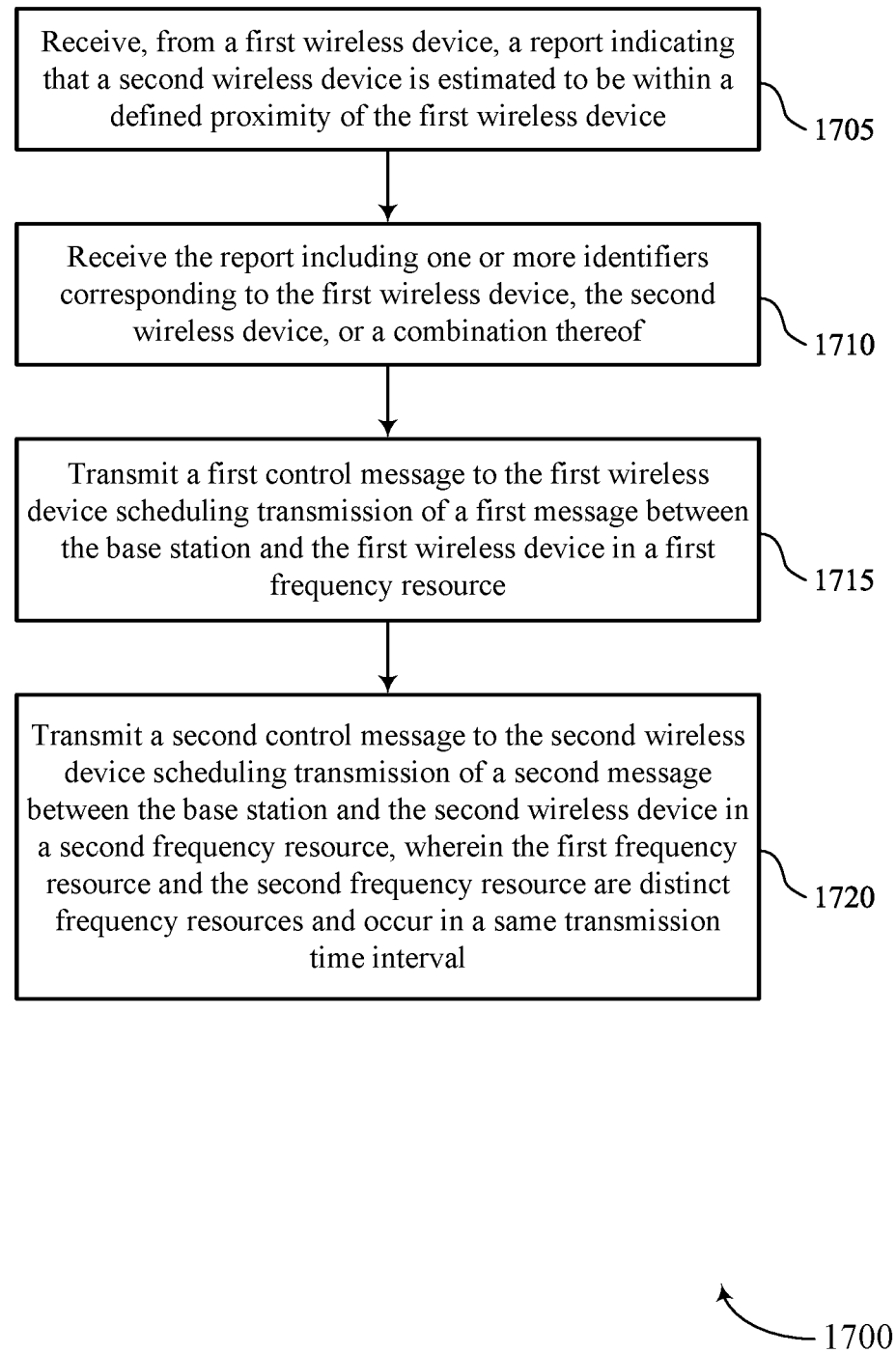

FIG. 17 shows a flowchart illustrating a method 1700 that supports sidelink assisted CLI determination in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include receiving, from a first wireless device, a report indicating that a second wireless device is estimated to be within a defined proximity of the first wireless device. The operations of 1705 may be performed in accordance with examples as disclosed herein. In some examples, aspects of the operations of 1705 may be performed by a report receiver 1025 as described with reference to FIG. 10.

At 1710, the method may include receiving the report including one or more identifiers corresponding to the first wireless device, the second wireless device, or a combination thereof. The operations of 1710 may be performed in accordance with examples as disclosed herein. In some examples, aspects of the operations of 1710 may be performed by a report receiver 1025 as described with reference to FIG. 10.

At 1715, the method may include transmitting a first control message to the first wireless device scheduling transmission of a first message between the base station and the first wireless device in a first frequency resource. The operations of 1715 may be performed in accordance with examples as disclosed herein. In some examples, aspects of the operations of 1715 may be performed by a control message transmitter 1030 as described with reference to FIG. 10.

At 1720, the method may include transmitting a second control message to the second wireless device scheduling transmission of a second message between the base station and the second wireless device in a second frequency resource, where the first frequency resource and the second frequency resource are distinct frequency resources and occur in a same transmission time interval. The operations of 1720 may be performed in accordance with examples as disclosed herein. In some examples, aspects of the operations of 1720 may be performed by a control message transmitter 1030 as described with reference to FIG. 10.

Figure 18:
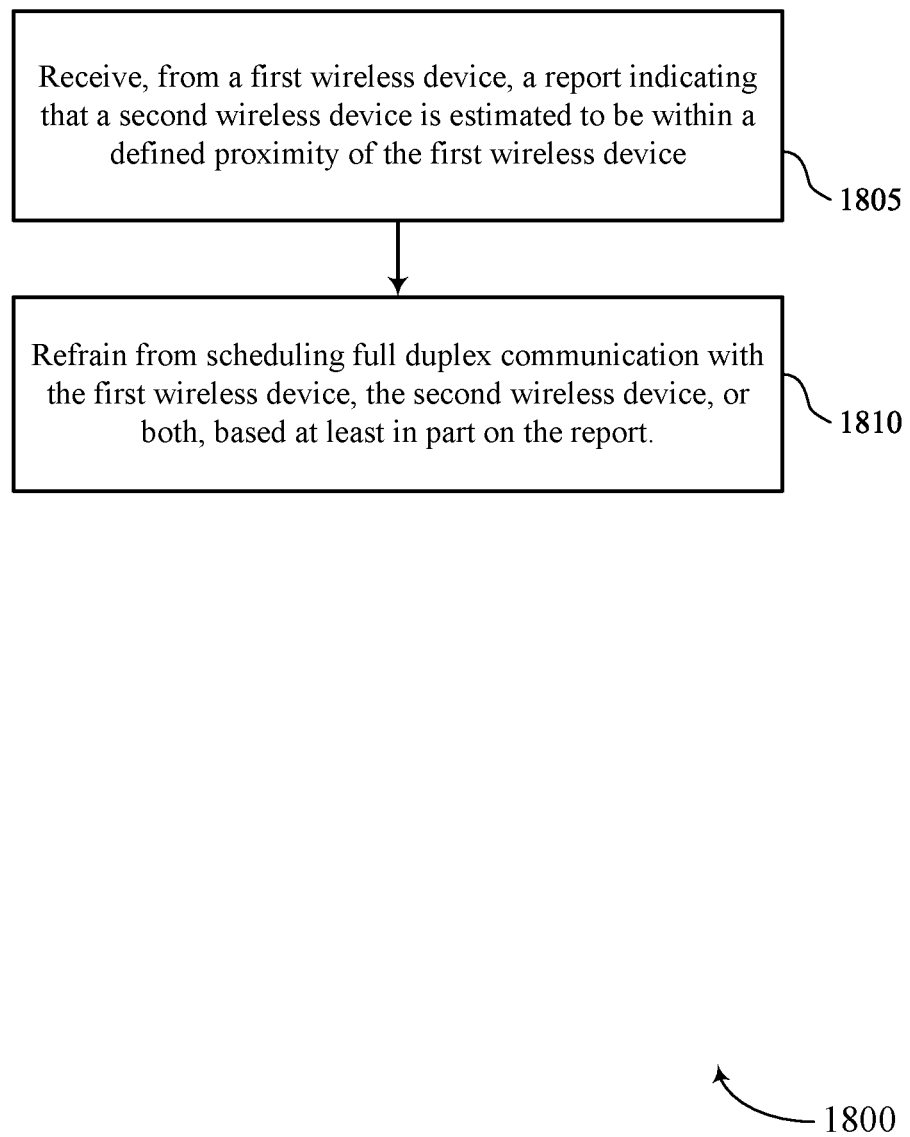

FIG. 18 shows a flowchart illustrating a method 1800 that supports sidelink assisted CLI determination in accordance with aspects of the present disclosure. The operations of the method 1800 may be implemented by a base station or its components as described herein. For example, the operations of the method 1800 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1805, the method may include receiving, from a first wireless device, a report indicating that a second wireless device is estimated to be within a defined proximity of the first wireless device. The operations of 1805 may be performed in accordance with examples as disclosed herein. In some examples, aspects of the operations of 1805 may be performed by a report receiver 1025 as described with reference to FIG. 10.

At 1810, the method may include refraining from scheduling full duplex communication with the first wireless device, the second wireless device, or both, based at least in part on the report. The operations of 1810 may be performed in accordance with examples as disclosed herein. In some examples, aspects of the operations of 1810 may be performed by a report receiver 1025 as described with reference to FIG. 10.

The following provides an overview of aspects of the present disclosure:

Aspect 1: A method for wireless communication at a first wireless device, comprising: performing a first measurement of a sidelink message received from a second wireless device; transmitting, to a base station, a report indicating that the second wireless device is estimated to be within a defined proximity of the first wireless device based at least in part on the first measurement satisfying a threshold; and receiving a control message, from the base station, scheduling transmission of a message between the base station and the first wireless device in a frequency resource in response to the report indicating that the second wireless device is estimated to be within the defined proximity of the first wireless device Aspect 2: The method of aspect 1, further comprising: transmitting the report indicating the first measurement.

Aspect 3: The method of any of aspects 1 through 2, further comprising: monitoring a sidelink channel for resource reservations, wherein the sidelink message is a resource reservation received from the second wireless device via the sidelink channel based at least in part on the monitoring.

Aspect 4: The method of any of aspects 1 through 3, further comprising: transmitting the report indicating a source identifier of the second wireless device.

Aspect 5: The method of any of aspects 1 through 4, further comprising: receiving, from the base station, control information indicating the threshold.

Aspect 6: The method of any of aspects 1 through 5, wherein the threshold comprises a reference signal received power threshold.

Aspect 7: The method of any of aspects 1 through 6, further comprising: transmitting the report indicating a measured beam identifier, a panel identifier, or both.

Aspect 8: The method of any of aspects 1 through 7, further comprising: transmitting the report periodically, semi-persistently, or aperiodically.

Aspect 9: The method of any of aspects 1 through 8, further comprising: receiving control signaling indicating a trigger for transmitting the report when a neighbor UE is estimated to be within the defined proximity of the first wireless device.

Aspect 10: The method of aspect 9, further comprising: receiving control signaling indicating a deactivation trigger indicating that the first wireless device is to refrain from transmitting a second report.

Aspect 11: The method of any of aspects 1 through 10, further comprising: receiving control signaling indicating a trigger for transmitting the report in accordance with a measurement satisfying the threshold.

Aspect 12: The method of any of aspects 1 through 11, wherein the first measurement is a reference signal received power measurement, an interference measurement, a cross link interference measurement, a received signal strength indicator, a signal to noise ratio measurement, a signal to interference plus noise ratio measurement, or any combination thereof.

Aspect 13: The method of any of aspects 1 through 12, wherein the sidelink message is a UE dedicated sidelink control information message or a group based sidelink control information message.

Aspect 14: A method for wireless communications at a base station, comprising: receiving, from a first wireless device, a report indicating that a second wireless device is estimated to be within a defined proximity of the first wireless device; transmitting a first control message to the first wireless device scheduling transmission of a first message between the base station and the first wireless device in a first frequency resource; and transmitting a second control message to the second wireless device scheduling transmission of a second message between the base station and the second wireless device in a second frequency resource, wherein the first frequency resource and the second frequency resource are distinct frequency resources and occur in a same transmission time interval.

Aspect 15: The method of aspect 14, further comprising: transmitting, to the first wireless device, control information indicating a threshold associated with estimating wireless devices to be within the defined proximity of the first wireless device.

Aspect 16: The method of aspect 15, wherein the threshold comprises a reference signal received power threshold.

Aspect 17: The method of any of aspects 14 through 16, further comprising: receiving the report including one or more identifiers corresponding to the first wireless device, the second wireless device, or a combination thereof.

Aspect 18: The method of aspect 17, wherein the one or more identifiers comprise a measured beam identifier, a panel identifier, or a both.

Aspect 19: The method of aspect 18, further comprising: identifying interference associated with the one or more identifiers, wherein scheduling the transmission of the first message and scheduling the transmission of the second message is based at least in part on identifying the interference.

Aspect 20: The method of any of aspects 14 through 19, further comprising: transmitting control signaling indicating a trigger to transmit the report in accordance with estimating the second wireless device to be within the defined proximity of the first wireless device.

Aspect 21: The method of aspect 20, further comprising: transmitting control signaling indicating a deactivation trigger configuring the first wireless device to refrain from transmitting the report.

Aspect 22: The method of any of aspects 14 through 21, further comprising: transmitting control signaling indicating a trigger for transmitting the report in accordance with a measurement satisfying a threshold.

Aspect 23: The method of any of aspects 14 through 22, further comprising: receiving the report indicating a first measurement, wherein transmitting the first control message and transmitting the second control message is based at least in part on the first measurement.

Aspect 24: The method of aspect 23, wherein the first measurement is a reference signal received power measurement, an interference measurement, a cross link interference measurement, a received signal strength indicator, a signal to noise ratio measurement, a signal to interference plus noise ratio measurement, or any combination thereof.

Aspect 25: The method of any of aspects 14 through 24, wherein the first frequency resource and the second frequency resource are separated by one or more guard tones, one or more resource elements, a frequency range, or any combination thereof.

Aspect 26: The method of any of aspects 14 through 25, wherein the first frequency resource and the second frequency resource occur within a same bandwidth part.

Aspect 27: The method of any of aspects 14 through 26, further comprising: receiving, from a third wireless device, a second report indicating that a fourth wireless device is estimated to be within a defined proximity of the third wireless device; and refraining from scheduling full duplex communication with the third wireless device, the fourth wireless device, or both.

Aspect 28: A method for wireless communications at a base station, comprising: receiving, from a first wireless device, a report indicating that a second wireless device is estimated to be within a defined proximity of the first wireless device; and refraining from scheduling full duplex communication with the first wireless device, the second wireless device, or both, based at least in part on the report.

Aspect 29: The method of aspect 28, further comprising: transmitting, to the first wireless device, control information indicating a threshold associated with estimating wireless devices to be within the defined proximity of the first wireless device.

Aspect 30: An apparatus for wireless communication at a first wireless device, comprising a processor; memory coupled with the processor; and instructions stored in the memory and executable by the processor to cause the apparatus to perform a method of any of aspects 1 through 13.

Aspect 31: An apparatus for wireless communication at a first wireless device, comprising at least one means for performing a method of any of aspects 1 through 13.

Aspect 32: A non-transitory computer-readable medium storing code for wireless communication at a first wireless device, the code comprising instructions executable by a processor to perform a method of any of aspects 1 through 13.

Aspect 33: An apparatus for wireless communications at a base station, comprising a processor; memory coupled with the processor; and instructions stored in the memory and executable by the processor to cause the apparatus to perform a method of any of aspects 14 through 27.

Aspect 34: An apparatus for wireless communications at a base station, comprising at least one means for performing a method of any of aspects 14 through 27.

Aspect 35: A non-transitory computer-readable medium storing code for wireless communications at a base station, the code comprising instructions executable by a processor to perform a method of any of aspects 14 through 27.

Aspect 36: An apparatus for wireless communications at a base station, comprising a processor; memory coupled with the processor; and instructions stored in the memory and executable by the processor to cause the apparatus to perform a method of any of aspects 28 through 29.

Aspect 37: An apparatus for wireless communications at a base station, comprising at least one means for performing a method of any of aspects 28 through 29.

Aspect 38: A non-transitory computer-readable medium storing code for wireless communications at a base station, the code comprising instructions executable by a processor to perform a method of any of aspects 28 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
   receiving control signaling indicating a trigger for transmitting a report when a neighbor user equipment (UE) is estimated to be within a defined proximity of the first wireless device;
   performing a first measurement of a sidelink message received from a second wireless device;
   transmitting, to a base station, the report indicating that the second wireless device is estimated to be within the defined proximity of the first wireless device based at least in part on the first measurement satisfying a threshold; and
   receiving a control message, from the base station, scheduling transmission of a message between the base station and the first wireless device in a frequency resource in response to the report indicating that the second wireless device is estimated to be within the defined proximity of the first wireless device.

2. The method of claim 1, further comprising:
   transmitting the report indicating the first measurement.

3. The method of claim 1, further comprising:
   monitoring a sidelink channel for resource reservations, wherein the sidelink message is a resource reservation received from the second wireless device via the sidelink channel based at least in part on the monitoring.

4. The method of claim 1, further comprising:
   transmitting the report indicating a source identifier of the second wireless device.

5. The method of claim 1, further comprising:
   receiving, from the base station, control information indicating the threshold.

6. The method of claim 1, wherein the threshold comprises a reference signal received power threshold.

7. The method of claim 1, further comprising:
   transmitting the report indicating a measured beam identifier, a panel identifier, or both.

8. The method of claim 1, further comprising:
   transmitting the report periodically, semi-persistently, or aperiodically.

9. The method of claim 1, further comprising:
receiving the control signaling indicating a deactivation trigger indicating that the first wireless device is to refrain from transmitting a second report.

10. The method of claim 1, further comprising:
receiving the control signaling indicating the trigger for transmitting the report in accordance with a measurement satisfying the threshold.

11. The method of claim 1, wherein the first measurement is a reference signal received power measurement, an interference measurement, a cross link interference measurement, a received signal strength indicator, a signal to noise ratio measurement, a signal to interference plus noise ratio measurement, or any combination thereof.

12. The method of claim 1, wherein the sidelink message is a UE dedicated sidelink control information message or a group based sidelink control information message.

13. A method for wireless communications at a base station, comprising:
transmitting control signaling indicating a trigger to transmit a report in accordance with estimating a second wireless device to be within a defined proximity of a first wireless device;
receiving, from the first wireless device, the report indicating that the second wireless device is estimated to be within the defined proximity of the first wireless device;
transmitting a first control message to the first wireless device scheduling transmission of a first message between the base station and the first wireless device in a first frequency resource; and
transmitting a second control message to the second wireless device scheduling transmission of a second message between the base station and the second wireless device in a second frequency resource, wherein the first frequency resource and the second frequency resource are distinct frequency resources and occur in a same transmission time interval.

14. The method of claim 13, further comprising:
transmitting, to the first wireless device, control information indicating a threshold associated with estimating wireless devices to be within the defined proximity of the first wireless device.

15. The method of claim 14, wherein the threshold comprises a reference signal received power threshold.

16. The method of claim 13, further comprising:
receiving the report including one or more identifiers corresponding to the first wireless device, the second wireless device, or a combination thereof.

17. The method of claim 16, wherein the one or more identifiers comprise a measured beam identifier, a panel identifier, or a both.

18. The method of claim 17, further comprising:
identifying interference associated with the one or more identifiers, wherein scheduling the transmission of the first message and scheduling the transmission of the second message is based at least in part on identifying the interference.

19. The method of claim 13, further comprising:
transmitting the control signaling indicating a deactivation trigger configuring the first wireless device to refrain from transmitting the report.

20. The method of claim 13, further comprising:
transmitting the control signaling indicating the trigger for transmitting the report in accordance with a measurement satisfying a threshold.

21. The method of claim 13, further comprising:
receiving the report indicating a first measurement, wherein transmitting the first control message and transmitting the second control message is based at least in part on the first measurement.

22. The method of claim 21, wherein the first measurement is a reference signal received power measurement, an interference measurement, a cross link interference measurement, a received signal strength indicator, a signal to noise ratio measurement, a signal to interference plus noise ratio measurement, or any combination thereof.

23. The method of claim 13, wherein the first frequency resource and the second frequency resource are separated by one or more guard tones, one or more resource elements, a frequency range, or any combination thereof.

24. The method of claim 13, wherein the first frequency resource and the second frequency resource occur within a same bandwidth part.

25. The method of claim 13, further comprising:
receiving, from a third wireless device, a second report indicating that a fourth wireless device is estimated to be within the defined proximity of the third wireless device; and
refraining from scheduling full duplex communication with the third wireless device, the fourth wireless device, or both, based at least in part on the second report.

26. An apparatus for wireless communication at a first wireless device, comprising:
one or more processors;
one or more memories coupled with the one or more processors; and
instructions stored in the one or more memories and executable by the one or more processors to cause the apparatus to:
receive control signaling indicating a trigger for transmitting a report when a neighbor UE is estimated to be within a defined proximity of the first wireless device;
perform a first measurement of a sidelink message received from a second wireless device;
transmit, to a base station, the report indicating that the second wireless device is estimated to be within the defined proximity of the first wireless device based at least in part on the first measurement satisfying a threshold; and
receive a control message, from the base station, scheduling transmission of a message between the base station and the first wireless device in a frequency resource in response to the report indicating that the second wireless device is estimated to be within the defined proximity of the first wireless device.

27. A method for wireless communications at a base station, comprising:
transmitting control signaling indicating a trigger to transmit a report in accordance with estimating a second wireless device to be within a defined proximity of a first wireless device;
receiving, from the first wireless device, the report indicating that the second wireless device is estimated to be within the defined proximity of the first wireless device; and
refraining from scheduling full duplex communication with the first wireless device, the second wireless device, or both, based at least in part on the report.

28. The method of claim 27, further comprising:
transmitting, to the first wireless device, control information indicating a threshold associated with estimating wireless devices to be within the defined proximity of the first wireless device.

* * * * *